(12) United States Patent
Seo et al.

(10) Patent No.: US 10,033,710 B2
(45) Date of Patent: Jul. 24, 2018

(54) ELECTRONIC DEVICE AND METHOD OF TRANSMITTING AND RECEIVING INFORMATION BY ELECTRONIC DEVICE

(71) Applicant: Samsung Electronics Co., Ltd., Suwon-si, Gyeonggi-do (KR)

(72) Inventors: Jae-Woo Seo, Suwon-si (KR); Woo-Chul Shim, Yongin-si (KR); Choong-Hoon Lee, Yongin-si (KR); Yong-Ho Hwang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 247 days.

(21) Appl. No.: 14/952,134

(22) Filed: Nov. 25, 2015

(65) Prior Publication Data

US 2016/0156467 A1    Jun. 2, 2016

(30) Foreign Application Priority Data

Nov. 27, 2014    (KR) .......................... 10-2014-0167530

(51) Int. Cl.
| | |
|---|---|
| *H04L 9/08* | (2006.01) |
| *H04L 29/06* | (2006.01) |
| *H04L 9/32* | (2006.01) |
| *H04W 12/02* | (2009.01) |
| *H04W 12/04* | (2009.01) |

(52) U.S. Cl.
CPC ............ *H04L 63/06* (2013.01); *H04L 9/0838* (2013.01); *H04L 9/3236* (2013.01); *H04W 12/02* (2013.01); *H04L 63/062* (2013.01); *H04W 12/04* (2013.01)

(58) Field of Classification Search
CPC ..... H04L 9/3236; H04L 63/06; H04L 63/062; H04L 9/0838; H04W 12/04; H04W 12/02
USPC ........................................................ 713/171
See application file for complete search history.

(56) References Cited

U.S. PATENT DOCUMENTS

| | | | |
|---|---|---|---|
| 2009/0055648 A1* | 2/2009 | Kim ..................... | H04L 63/06 713/171 |
| 2014/0115326 A1* | 4/2014 | Kim ..................... | H04L 29/06 713/160 |
| 2014/0133655 A1 | 5/2014 | Kritt et al. | |
| 2014/0173270 A1 | 6/2014 | Matsuo | |

FOREIGN PATENT DOCUMENTS

JP    4377619 B2    12/2009

\* cited by examiner

*Primary Examiner* — Baotran N To
(74) *Attorney, Agent, or Firm* — Jefferson IP Law, LLP

(57) ABSTRACT

A first electronic device is provided. The first electronic device includes a transceiver, and a processor configured to encrypt a part of information related to a second communication based on information related to a first communication performed between the first electronic device and a second electronic device and control the transceiver to transmit information related to the second communication to the second electronic device through the transceiver.

26 Claims, 26 Drawing Sheets

ELECTRONIC DEVICE AND METHOD OF TRANSMITTING AND RECEIVING INFORMATION BY ELECTRONIC DEVICE

CROSS-REFERENCE TO RELATED APPLICATION(S)

This application claims the benefit under 35 U.S.C. § 119(a) of a Korean patent application filed on Nov. 27, 2014 in the Korean Intellectual Property Office and assigned Serial number 10-2014-0167530, the entire disclosure of which is hereby incorporated by reference.

TECHNICAL FIELD

The present disclosure relates to an electronic device and a method of transmitting and receiving information by an electronic device.

BACKGROUND

When transmitting information, various electronic devices may perform secret communication to prevent the information from being leaked or hacked. To this end, the electronic device may encrypt and transmit the information and the receiving side electronic device may decrypt the received encrypted information.

Accordingly, only the electronic device, which can decrypt the encrypted information, can identify the information.

The above information is presented as background information only to assist with an understanding of the present disclosure. No determination has been made, and no assertion is made, as to whether any of the above might be applicable as prior art with regard to the present disclosure.

SUMMARY

However, in order to perform secret communication, various electronic devices should subscribe to a particular service. Even though the electronic devices transmit/receive encrypted information through the secret communication, the encrypted information may be exposed to service providers in some services based on the subscription to the service.

Further, the electronic devices may encrypt information by using a shared secret key. However, for secret key sharing between the transmitting side and the receiving side, a user authentication should be performed based on a certificate. The certificate is issued after user information is registered in a server and a separate authentication process is performed.

Aspects of the present disclosure are to address at least the above-mentioned problems and/or disadvantages and to provide at least the advantages described below. Accordingly, an aspect of the present disclosure is to provide an electronic device for encrypting information to be transmitted, by using information related to a communication performed between, for example, a first electronic device and a second electronic device, and a method of transmitting information by an electronic device.

In accordance with an aspect of the present disclosure, a first electronic device is provided. The first electronic device includes a transceiver and a processor configured to encrypt a part of information related to a second communication based on information related to a first communication performed between the first electronic device and a second electronic device and control the transceiver to transmit the information related to the second communication to the second electronic device through the transceiver.

In accordance with another aspect of the present disclosure, a second electronic device is provided. The second electronic device includes transceiver and a processor configured to control the transceiver to receive information related to a second communication having an encrypted part that is encrypted based on information related to a first communication performed between a first electronic device and the second electronic device and decrypt the received second communication based on the information related to the first communication.

In accordance with another aspect of the present disclosure, a method of transmitting information by a first electronic device is provided. The method includes identifying information related to a first communication performed between the first electronic device and a second electronic device, encrypting a part of information related to a second communication based on the identified information related to the first communication, and transmitting information related to the second communication to the second electronic device.

In accordance with another aspect of the present disclosure, a method of receiving information by a second electronic device is provided. The method includes identifying information related to a first communication performed between a first electronic device and the second electronic device, receiving information related to a second communication having an encrypted part from the first electronic device, and decrypting the encrypted part based on the identified information related to the first communication.

According to an electronic device and a method of transmitting and receiving information by an electronic device according to various embodiments, information to be transmitted may be transmitted after encryption by using information related to a communication performed between a first electronic device and a second electronic device, so that a server and a third electronic device cannot identify the information. As a result, it is possible to safely perform secret communication without any information exposure and to increase user convenience without the need to perform a complex authentication process.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
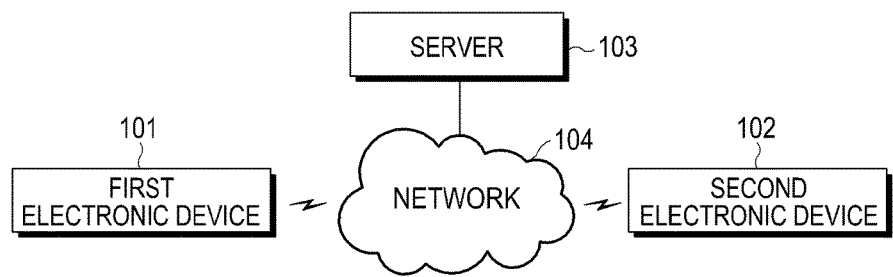
FIG. 1 illustrates a system for information transmission according to various embodiments of the present disclosure.

The following description with reference to the accompanying drawings is provided to assist in a comprehensive understanding of various embodiments of the present disclosure. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the present disclosure, the expression "include" or "may include" refers to existence of a corresponding function, operation, or element, and does not limit one or more additional functions, operations, or elements. In the present disclosure, the terms such as "include" and/or "have" may be construed to denote a certain characteristic, number, operation, constituent element, element or a combination thereof, but may not be construed to exclude the existence of or a possibility of addition of one or more other characteristics, numbers, operations, constituent elements, elements or combinations thereof.

In the present disclosure, the expression "A or B", "at least one of A or/and B", or "one or more of A or/and B" may include all possible combinations of the items listed. For example, the expression "A or B", "at least one of A and B", or "at least one of A or B" may include (1) at least one A, (2) at least one B, or (3) both at least one A and at least one B.

The expression "a first", "a second", "the first", or "the second" used in various embodiments of the present disclosure may modify various components regardless of the order and/or the importance but does not limit the corresponding components. The above expressions are used merely for the purpose of distinguishing an element from the other elements. For example, a first user device and a second user device indicate different user devices although both of them are user devices. For example, a first element may be termed a second element, and similarly, a second element may be termed a first element without departing from the scope of the present disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposer between them. In contrast, it may be understood that when an element (e.g., first element) is referred to as being "directly connected," or "directly coupled" to another element (second element), there are no element (e.g., third element) interposed between them.

As used herein, the expression "configured to" may be interchangeably used with the expression "suitable for", "having the capability to", "designed to", "adapted to", "made to", or "capable of". The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g. embedded processor) only for performing the corresponding operations or a generic-purpose processor (e.g., central processing unit (CPU) or application processor (AP)) that can perform the corresponding operations by executing one or more software programs stored in a memory device.

The terms used in the present disclosure are only used to describe specific embodiments, and are not intended to limit the present disclosure. As used herein, singular forms may include plural forms as well unless the context clearly indicates otherwise.

Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure. In some cases, even the term defined in the present disclosure should not be interpreted to exclude embodiments of the present disclosure.

For example, the electronic device may include at least one of a smartphone, a tablet personal computer (PC), a mobile phone, a video phone, an electronic book (e-book) reader, a desktop PC, a laptop PC, a netbook computer, a personal digital assistant (PDA), a portable multimedia player (PMP), an MP3 player, a mobile medical appliance, a camera, and a wearable device (e.g., a head-mounted-device (HMD) such as electronic glasses, electronic clothes, an electronic bracelet, an electronic necklace, an electronic appcessory, electronic tattoos, or a smart watch).

According to some embodiments, the electronic device may be a smart home appliance. The home appliance may include at least one of, for example, a television, a digital video disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

According to another embodiment, the electronic device may include at least one of various medical devices (e.g., various portable medical measuring devices (a blood glucose monitoring device, a heart rate monitoring device, a blood pressure measuring device, a body temperature measuring device, etc.), a magnetic resonance angiography (MRA), a magnetic resonance imaging (MRI), a computed tomography (CT) machine, and an ultrasonic machine), a navigation device, a global positioning system (GPS) receiver, an event data recorder (EDR), a flight data recorder (FDR), a vehicle infotainment devices, an electronic devices for a ship (e.g., a navigation device for a ship, and a gyro-compass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.).

According to various embodiments of the present disclosure, the electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device according to various embodiments of the present disclosure may be a combination of one or more of the aforementioned various devices. The electronic device according to some embodiments of the present disclosure may be a flexible device. Further, the electronic device according to an embodiment of the present disclosure is not limited to the aforementioned devices, and may include a new electronic device according to the development of technology.

Hereinafter, an electronic device according to various embodiments of the present disclosure will be described with reference to the accompanying drawings. In various embodiments, the term "user" may indicate a person using an electronic device or a device (e.g. an artificial intelligence electronic device) using an electronic device.

FIG. 1 illustrates a system for information transmission according to various embodiments of the present disclosure.

Referring to FIG. 1, the system may include at least one of a first electronic device 101, a second electronic device 102, and a server 103, and the first electronic device 101, the second electronic device 102, or the server 103 may communicate with each other through a network 104.

The first electronic device 101 may communicate with the second electronic device 102 and the server 103 through the network 104, encrypt information to be transmitted by using information related to the communication performed between the first electronic device 101 and the second electronic device 102, and transmit the encrypted information to the second electronic device 102.

The second electronic device 102 may communicate with the first electronic device 101 and the server 103 through the network 104, receive encrypted information by using information related to the communication performed between the first electronic device 101 and the second electronic device 102, and decrypt the received information by using the information related to the communication performed between the first electronic device 101 and the second electronic device 102.

The server 103 may support operations of the first electronic device 101 or the second electronic device 102 by performing at least one operation (or function) implemented by the first electronic device 101 or the second electronic device 102. For example, the server 103 may provide information for supporting a processor implemented in the first electronic device 101 or the second electronic device 102, and may perform (or act as a proxy) at least one of the operations (or functions) performed by the processor. The server 103 may support information transmission/reception between the first electronic device 101 and the second electronic device 102 and provide an application related to the information transmission/reception to the first electronic device 101 and the second electronic device 102.

The network 104 may be a communication network. The communication network may include at least one of a computer network, the Internet, the Internet of Things, and a telephone network. A protocol (for example, a transport layer protocol, a data link layer protocol, or a physical layer protocol) for communication between the first electronic device 101 or the second electronic device 102 and an external device may be supported by at least one of an application, an application programming interface (API), middleware, a kernel, and a communication interface.

Figure 2:
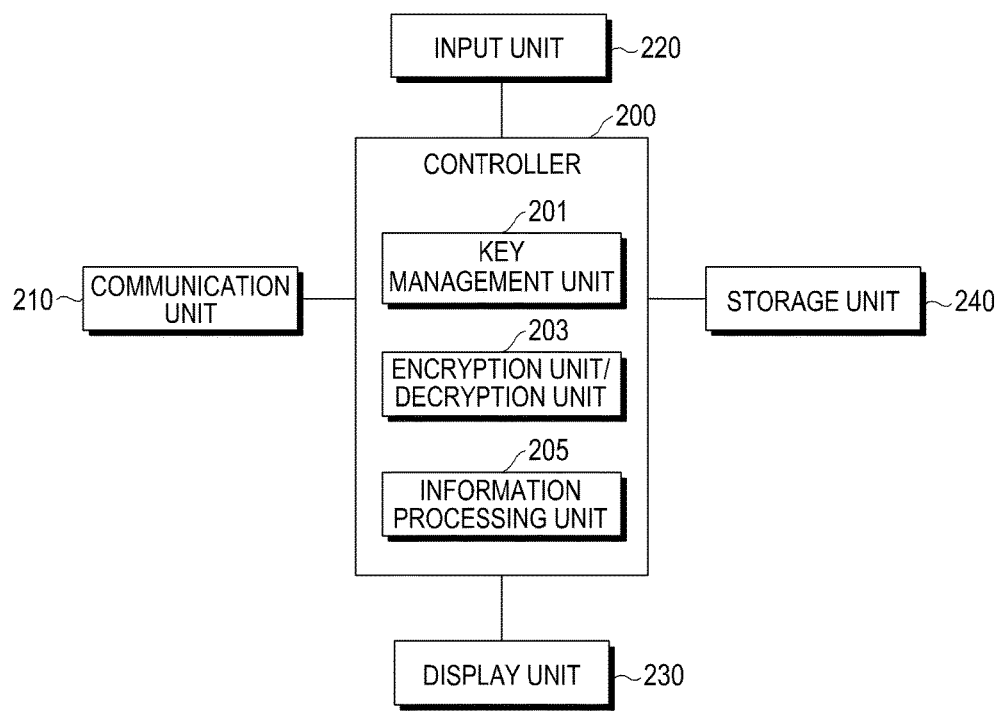
FIG. 2 illustrates a block diagram of an electronic device according to an embodiment of the present disclosure.

FIG. 2 illustrates a block diagram of an electronic device according to various embodiments of the present disclosure.

Referring to FIG. 2, the electronic device (for example, the first electronic device 101 or the second electronic device 102 illustrated in FIG. 1) may include a controller 200, a communication unit 210, an input unit 220, a display unit 230, and/or a storage unit 240. In some embodiments, at least one of the components of the electronic device may be omitted, or other components may be included.

Hereinafter, for the convenience of description, the first electronic device 101 serves as the transmitting party and the second electronic device 102 serves as the receiving party. Further, both the first electronic device 101 and the second electronic device 102 will be described with reference to FIG. 2.

In addition, a first communication and a second communication may exchange information between electronic devices. According to various embodiments of the present disclosure, the first communication may include a plurality of communications. Further, the second communication may transmit/receive at least partially encrypted information related to a second communication by using information related to the first communication. The information related to the first communication (for example, first information) may include call data, a call start time, a call end time, a call time, transmitted/received messages, and contents of email. Further, the information related to the second communication (for example, second information) may include text information, an image, a dynamic image, a sound source information, a location information, and an address book information.

Referring to FIG. 2, the controller 200 may identify the information related to the first communication between electronic devices (for example, the first electronic device 101 and the second electronic device 102 of FIG. 1). Further, the controller 200 may encrypt at least some of the information related to the second communication by using the identified information related to the first communication. The controller 200 may transmit partially encrypted information related to the second communication.

Further, the controller 200 may receive the encrypted information related to the second communication, and decrypt the partially encrypted second information by using the information related to the first communication. The controller 200 may display the decrypted information on the display unit 230, and output sound source information through a speaker (not shown) when the sound source information is included in the decrypted information.

According to an embodiment of the present disclosure, the controller 200 may include at least one of a key management unit 201, an encryption/decryption unit 203, and/or an information processing unit 205.

When a recipient is determined, the key management unit 201 may identify information for generating an encryption key (i.e., information related to the first communication between the first electronic device 101 and the second electronic device 102 by using information on the determined recipient and generate the encryption key by using the identified information). When the electronic device requests to share the key, the key management unit 201 may transmit a first hash value that is generated by hashing the identified information related to the first communication, compare the first hash value with a second hash value received from the electronic device receiving the request, and generate an encryption key when the hash values are identical. The first and second electronic device may request to share the key.

Further, the key management unit 201 may identify the information related to the first communication and generate a decryption key by using the identified information. The decryption key may be the same key generated that is identical to a method of generating the encryption key, or may be generated in a method that is different from generating the encryption key by using the information related to the first communication. When the information related to the first communication is received, the key management unit 201 may extract information from the information related to the first communication and generate a decryption key by using the extracted information.

Further, the key management unit 201 may generate the encryption or decryption key through various key generation methods as well as the aforementioned hash method. Although it has been described for the convenience of description that the electronic device making the request generates the encryption key and the electronic device receiving the request generates the decryption key, the encryption key may be first generated and shared, and then the decryption key may be generated using the shared encryption key.

The encryption/decryption unit 203 may encrypt information related to the second communication, for example, at least some pieces of information input from the user or information read from the storage unit 240, based on the encryption key. Further, when encrypted information is received, the encryption/decryption unit 203 may decrypt the encrypted information based on the decryption key.

The information processing unit 205 may control the communication unit 210 to transmit the information related to the second communication, which includes a part that is encrypted by the encryption key, and, when the information encrypted by the encryption key is received, may transmit the received encrypted information to the encryption/decryption unit 203. Further, the information processing unit 205 may control the display unit 230 to display the decrypted information related to the second communication and control the storage unit 240 to store the decrypted information related to the second communication. When the decrypted information includes sound source information, the information processing unit 205 may output the sound source information through a speaker (not shown).

The controller 200 of the first electronic device 101 or the second electronic device 102 may further include an operation execution unit (not shown) that executes operations of the electronic device. The operation execution unit may perform an operation in response to a user input or a detected input. The operation execution unit may control the display unit 240 to display an execution screen, an application, or information according to operation execution or control various operations of the electronic device (for example, at least one of vibration generation, sound output through a speaker, and an operation related to a camera module).

The controller 200 may be at least a part of the processor, and may include, for example, a combination of one or more of hardware, software, and firmware.

At least some components of the controller 200 may include a processor including a CPU/micro processing unit (MPU), a memory (for example, a register and/or a random access memory (RAM) to which at least one piece of memory loading data is loaded, and a bus for inputting/outputting at least one piece of data to the processor and the memory. Further, the controller 200 may include a predetermined program routine or program data which is loaded into the memory from a recording medium to perform a function via the processor.

According to an embodiment of the present disclosure, the communication unit 210 may communicate with another electronic device (not shown) or the server 103 through the communication interface. Further, the communication unit 210 may transmit or receive a message including encrypted information. The communication unit 210 may perform communication based on a connection to the network 104 through the communication interface for wired or wireless communication. The wireless communication may include at least one of, for example, wireless fidelity (Wi-Fi), Bluetooth® (BT), near field communication (NFC), GPS, and cellular communication (e.g., long term evolution (LTE), LTE-advanced (LTE-A), code division multiple access (CDMA), wideband CDMA (WCDMA), universal mobile telephone service (UMTS), wireless broadband (Wi-Bro), global system for mobile communications (GSM) or the like). The wired communication may include at least one of, for example, a universal serial bus (USB), a high definition multimedia interface (HDMI), recommended standard 232 (RS-232), and a plain old telephone service (POTS). The communication unit 210 may include all types of communication schemes which have been widely known or will be developed in the future as well as the aforementioned communication schemes.

The input unit 220 may transmit, to the controller 200, various pieces of information such as number and character information input from the user, function settings, and signals which are input in connection with a control of functions of the electronic device. Further, the input unit 220 may support a user input for executing an application that supports a particular function. The input unit 220 may include at least one of a key input means such as a keyboard or a keypad, a touch input means such as a touch sensor or a touch pad, a sound source input means, various sensors, and a camera, and further include a gesture input means. In addition, the input unit 220 may include all types of input means which are being developed currently or will be developed in the future.

The input unit 220 may receive information input by the user through a touch panel of the display unit 230 (i.e., information related to the second information from the user) and transmit the input information to the controller 200.

The input unit 220 may include an input window (for example, a first input window) for selecting recipient information, an input window (for example, a second input window) for inputting text information, and various input pads. The various input pads may include, for example, a character input button (for example, a keypad) for inputting information, a button (for example, a first button) for attaching an image, a picture, or a file, a button (for example, a second button) for encryption, and a button (for example, a third button) for transmitting a message, and also include various buttons related to message transmission/reception as well as the aforementioned buttons. The button (for example, the second button) for encryption may encrypt at least one of the text information, the image, the picture, and the file by using the information related to the first communication that is performed between the first electronic device and the second electronic device.

The display unit 230 may display execution information and execution result information according to a control by the operation execution unit (not shown). The display unit 230 may display an executable application list or display an execution result of the set application. The display unit 230 may display various pieces of information (for example, text information, images, dynamic images, or sound source information) for the user. The display 230 may display, on a screen, an input window or an input pad through which characters, numbers, and symbols can be input in various ways.

The display unit 230 may display a service execution screen according to execution of various applications related to information transmission/reception. The display unit 230 may display information related to the second communication that is input into the service execution screen. The display unit 230 may display, on the execution screen, an input window (for example, a first input window) for select-ing a recipient, an input window (for example, a second input window) for inputting text information, a button (for example, a first button) for attaching an image, a picture, or a file, a button (for example, a second button) for encrypting at least one of the text information, the image, the picture, and the file by using information related to the first communication performed between the first electronic device and the second electronic device, or a button (for example, a third button) for transmitting a message.

When a partially encrypted information related to the second communication is received, the display unit 230 may display the received information related to the second communication on the service execution screen and display at least one of an image, an icon, and a menu for decrypting the partially encrypted information related to the second communication. Further, the display unit 230 may display decrypted information on the service execution screen.

When the display unit 230 of the first electronic device 101 or the second electronic device 102 is implemented as a touch screen form, the input unit 220 and/or the display unit 230 may correspond to the touch screen. When the display unit 230 is implemented in the touch screen form together with the input unit 220, the display unit 230 may display various pieces of information generated according to a user's touch input.

The display unit 230 may be configured by at least one of a liquid crystal display (LCD), a thin film transistor LCD (TFT-LCD), an organic light emitting diodes (OLEDs), LED, active matrix OLED (AMOLED), a flexible display, and a 3 dimensional display. Some of the displays may be implemented in a transparent type or a light transmission type so that the outside can be seen therethrough. The display may be implemented in a transparent display form including transparent OLED (TOLED).

The storage unit 240 may temporarily store various pieces of data generated during execution of a program including a program required for an operation of a function according to various embodiments. The storage unit 240 may also store information related to the first communication and information related to the second communication. Further, the storage unit 240 may store the encryption key and the decryption key generated by the controller 200. The storage unit 240 may include a program area and a data area. The program area may store pieces of information related to driving of the electronic device such as an operating system (OS) that boots the electronic device. The data area may store transmitted or received data or generated data.

The storage unit 240 may include at least one of the storage media including a flash memory, a hard disk, a multimedia card micro type memory (for example, a Secure Digital (SD) or XD memory), a RAM, and a read only memory (ROM).

As described above, main components of the electronic device of FIG. 2 have been described within the electronic device (for example, the first electronic device 101 or the second electronic device 102 of FIG. 1). However, not all components illustrated in FIG. 2 may be necessary or other components may be added. For example, the electronic device may further include a sound source output unit (for example, a speaker) (not shown) that converts an electrical signal into an analog signal and outputs the analog signal.

Further, locations of the main components of the electronic device illustrated in FIG. 2 may vary. In addition, components of the controller 200 are not limited to the components illustrated in FIG. 2, and the controller 200 may include various components that perform various functions.

A first electronic device according to one of the various embodiments of the present disclosure may include a communication unit and a processor that makes a control to encrypt at least a part of information related to a second communication by using information related to a first communication performed between the first electronic device and a second electronic device and to transmit the information related to the second communication to the second electronic device through the communication unit.

The first electronic device may further include a display unit that displays information related to the second communication.

The information related to the information related to the second communication of the first electronic device may be at least one of text information, an image, a dynamic image, sound source information, location information, and address book information.

The information related to the first communication of the first electronic device may be included in at least one of all or at least a part of call data, a call start time, a call end time, a call time, all or at least a part of transmitted or received messages, and all or at least a part of email.

The processor may control to transmit a first hash value generated by hashing the information related to the first communication to the second electronic device, and, when a second hash value received from the second electronic device is equal to the first hash value, to generate an encryption key for encrypting information related to the second communication by using the information related to the first communication.

The processor may, when receiving a request for secret communication while the information related to the second communication is input, encrypt at least a part of the information related to the second communication input before the secret communication is released by a generated encryption key based on the information related to the first communication.

When the information related to the first communication is text information, the processor may encrypt at least one sentence including a set word in the text information by a generated encryption key based on the information related to the first communication.

When the information related to the first communication is an image, the processor of the first electronic device may encrypt an area selected in the image by a generated encryption key based on the information related to the first communication.

When the information related to the first communication is a dynamic image, the processor of the first electronic device may encrypt a reproduction section selected in the dynamic image by a generated encryption key based on the information related to the first communication.

When encrypted information related to the second communication is received from the second electronic device, the processor may decrypt the received information related to the second communication based on the information related to the first communication.

The display unit may display a first input window for selecting a recipient, a second input window for inputting text information, and at least one of a first button and a second button on an execution screen, the first button may be for attaching an image, a picture, or a file, and the second button may be for encrypting at least a part of the text information, the image, the picture, or the file based on the information related to the first communication performed between the first electronic device and the second electronic device.

A second electronic device according to one of the various embodiments of the present disclosure may include a communication unit and a processor that makes a control to receive at least partially encrypted information related to the second communication through the communication unit based on information related to a first communication performed between a first electronic device and the second electronic device and to decrypt the received information related to the second communication based on the information related to the first communication performed between the first electronic device and the second electronic device.

The second electronic device may further include a display unit that displays the received information related to the second communication such that at least an encrypted part of the information related to the second communication cannot be identified, and, when at least the encrypted part is decrypted, displays the information related to the second communication such that at least the encrypted part can be identified.

The processor may control to receive a first hash value generated by hashing the information related to the first communication from the first electronic device, to transmit a second hash value generated by hashing the information related to the first communication corresponding to the received first hash value, and to generate a description key for decrypting at least a part of the information related to the second communication based on the information related to the first communication corresponding to the first hash value.

Hereinafter, a method of transmitting and receiving information by an electronic device according to various embodiments of the present disclosure will be described in detail with reference to the accompanying drawings.

Figure 3:
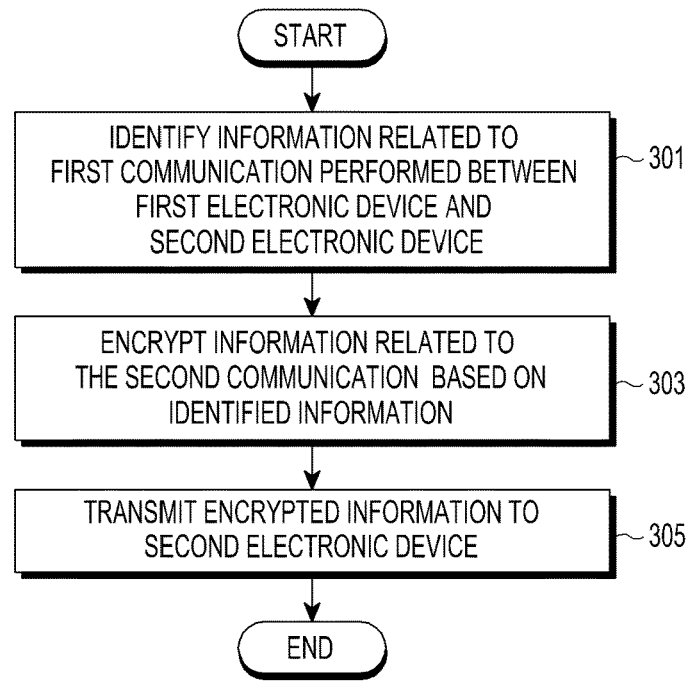
FIG. 3 illustrates a flowchart of a process to transmit encrypted information according to an embodiment of the present disclosure.

FIG. 3 illustrates a flowchart of a process to transmit encrypted information according to an embodiment of the present disclosure.

Referring to FIG. 3, the first electronic device may identify information related to a communication (for example, first communication) that was previously performed between the first electronic device and the second electronic device in operation 301.

In operation 303, the first electronic device may receive information related to the second communication to be transmitted by using the identified information related to the first communication from the user or read the information related to the second communication, and encrypt the input or read information by using the information related to the first communication. The information related to the first communication may be information that only the first electronic device and the second electronic device can know.

In operation 305, the first electronic device may transmit the encrypted information to the second electronic device through the second communication.

Figure 4:
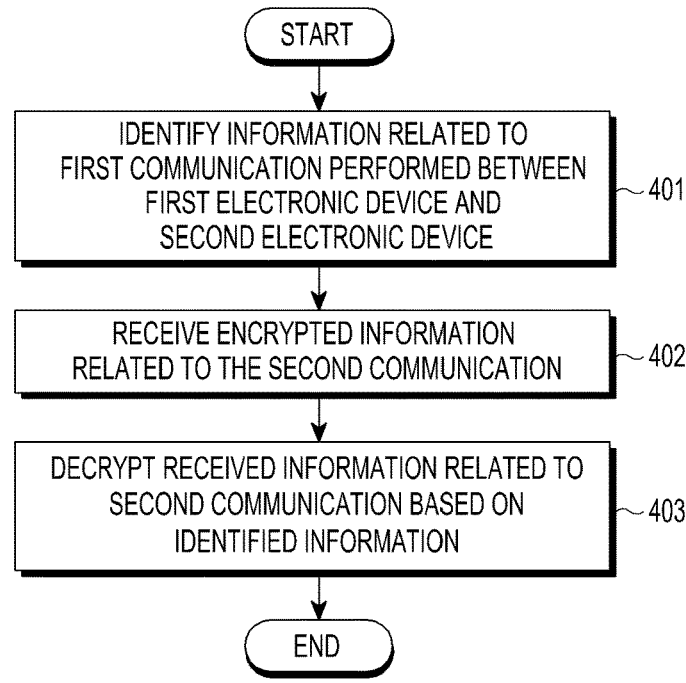
FIG. 4 illustrates a flowchart of a process to receive encrypted information according to an embodiment of the present disclosure.

FIG. 4 illustrates a flowchart of a process to receive encrypted information according to an embodiment of the present disclosure.

Referring to FIG. 4, the second electronic device may identify information related to the first communication that was previously performed between the first electronic device and the second electronic device in operation 401. The information related to the first communication may be information that only the first electronic device and the second electronic device can know.

In operation 403, the second electronic device may receive at least partially encrypted information related to the second communication from the first electronic device.

In operation 405, the second electronic device may decrypt the at least partially encrypted information related to the second communication by using the identified information related to the first communication.

The method of transmitting and receiving information by the electronic device according to various embodiments of the present disclosure will be described in more detail below with reference to FIG. 5.

Figure 5:
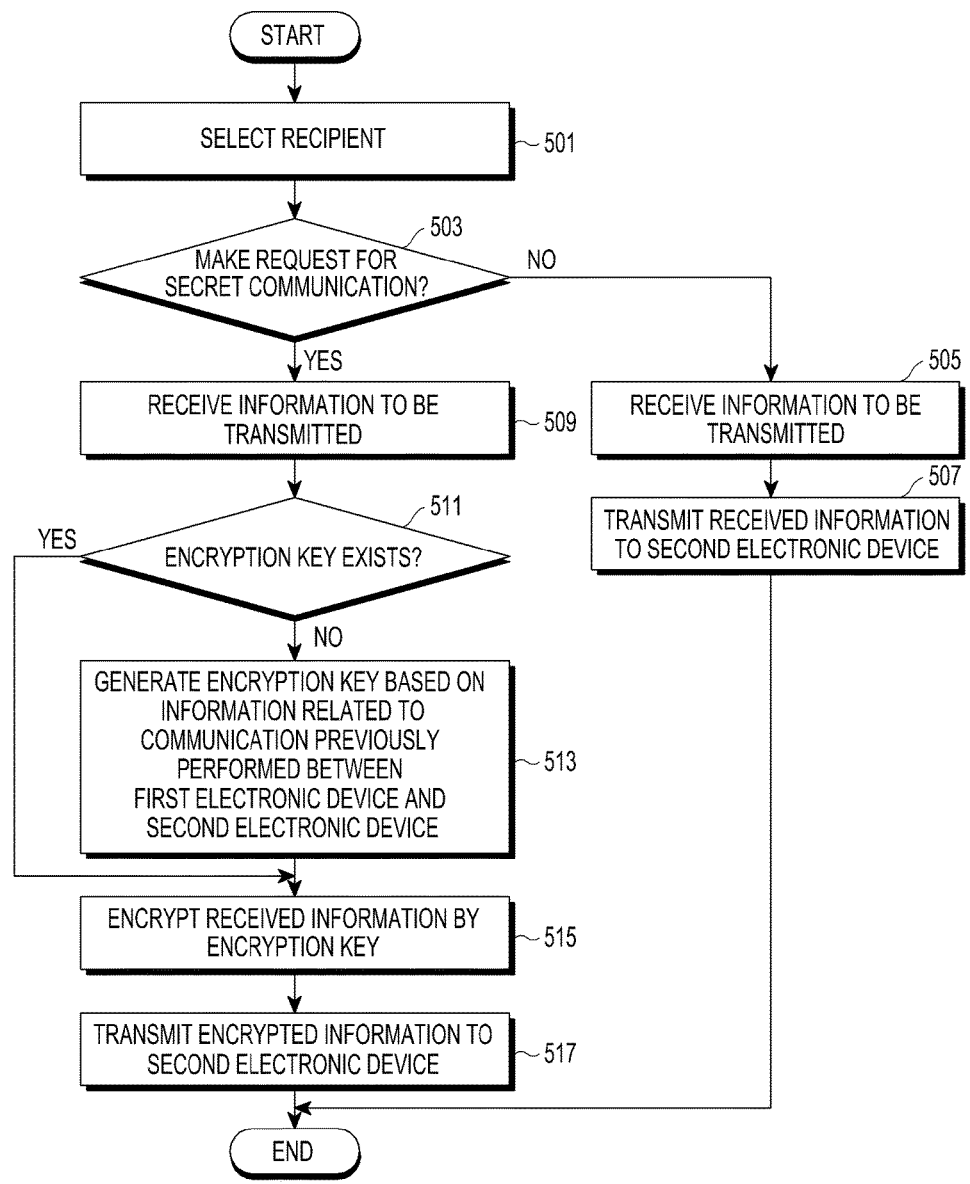
FIG. 5 illustrates a flowchart of a process to transmit encrypted information according to various embodiments of the present disclosure.
Figure 6:
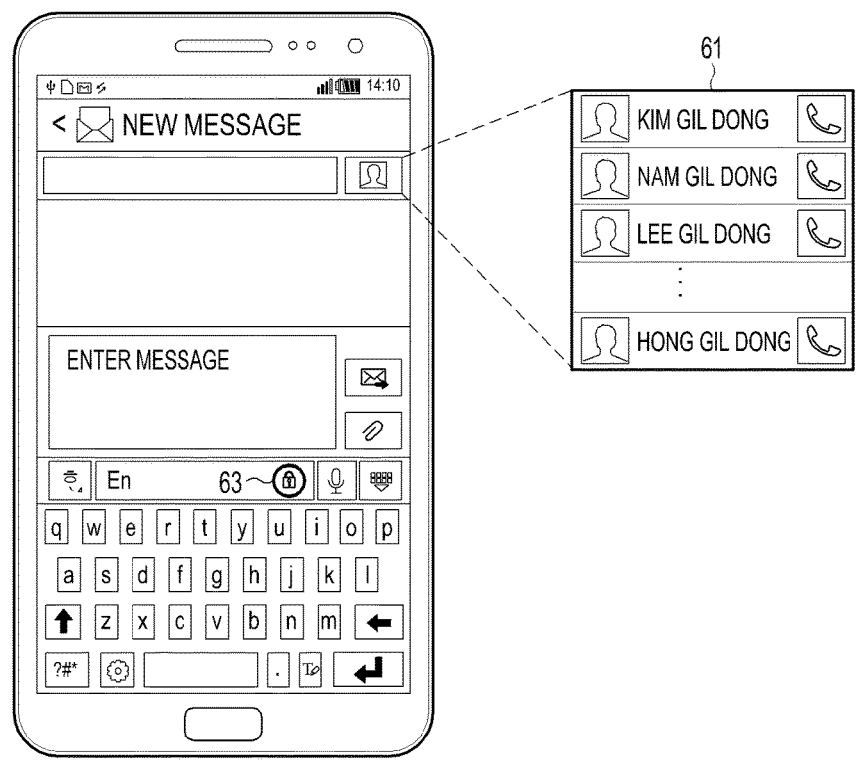
FIGS. 6, 7, and 8 illustrate examples of screens to transmit encrypted information according to various embodiments of the present disclosure.
Figure 7:
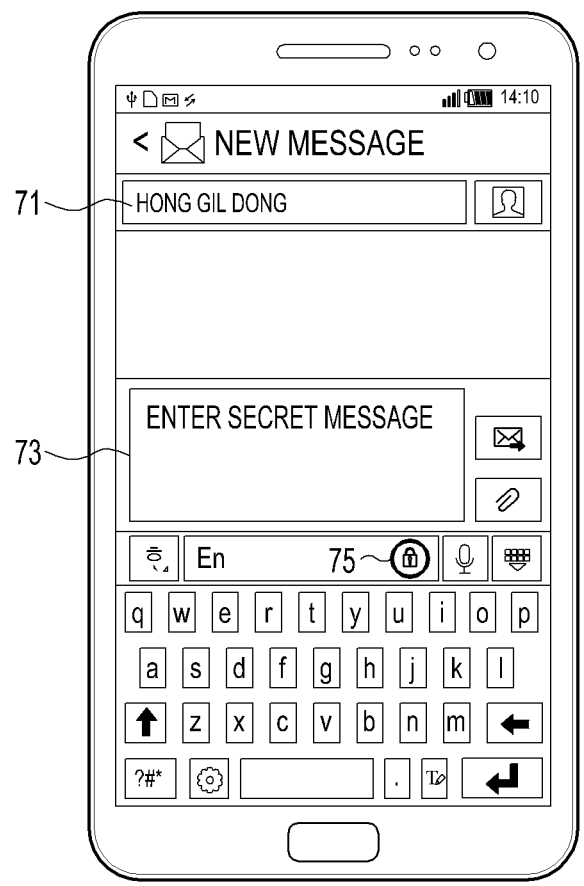
Figure 8:
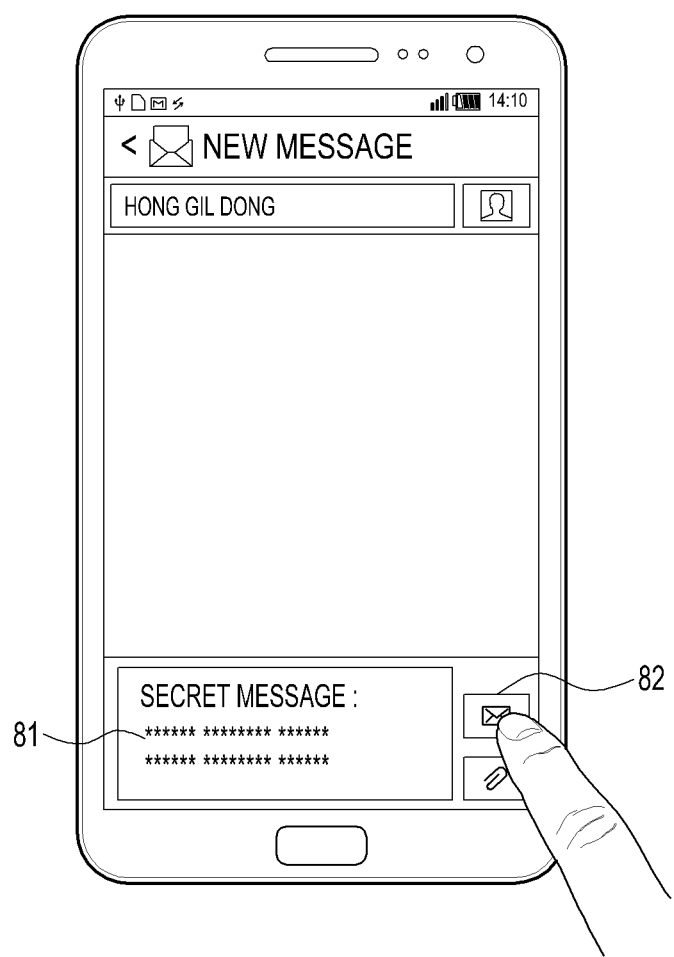

FIG. 5 illustrates a flowchart of a process to transmit encrypted information according to various embodiments of the present disclosure, and FIGS. 6, 7, and 8 illustrate examples of screens to transmit encrypted information according to various embodiments of the present disclosure.

Referring to FIG. 5, the first electronic device may execute, for example, an application related to message transmission and display a service execution screen displayed on the display (for example, the display unit 230 of FIG. 2).

In operation 501, the first electronic device may determine a recipient to which a message including information related to the second communication is transmitted. Referring to FIG. 6, the first electronic device may select a recipient from a stored contact list 61 by clicking a recipient button displayed on the service execution screen. Further, the first electronic device may directly input recipient information into a first input window for selecting the recipient. Referring to FIG. 7, when the recipient is determined, the first electronic device may display a recipient 71, for example, "Hong Gil Dong" in the first input window.

Referring back to FIG. 5, in operation 503, the first electronic device may identify whether there is a secret communication request from the user. For example, referring to FIG. 6, the first electronic device may identify whether a button 63 (for example, a second button) for selecting secret communication is selected. The first electronic device may provide an indication that the secret communication is to be performed via the button 63.

Referring back to FIG. 5, when the secret communication is not requested in operation 503, the first electronic device may receive transmission information, that is, related to the second communication to be transmitted, or read the information related to the second communication to be transmitted, from the storage unit in operation 505. In operation 507, the first electronic device may transmit the information related to the second communication to the second electronic device.

When the secret communication is requested in operation 503, for example, when the second button 63 is selected, the first electronic device may receive transmission information, that is, second communication information to be transmitted, or read the second communication information to be transmitted, from the storage unit in operation 509. Referring to FIG. 7, the first electronic device may display the second button 75 to indicate the secret communication and display a phrase, for example, "enter secret message" in a message input window 73. Referring to FIG. 8, the first electronic device may display the information related to the second communication as the secret message in a message input window 81.

Referring back to FIG. 5, in operation 511, the first electronic device may identify whether an encryption key already exists. When the encryption key exists, the first electronic device may proceed operation 515. When the encryption key does not exist, the first electronic device may proceed to operation 513 to generate an encryption key and then proceed to operation 515. The encryption key may be generated using the information related to the first communication performed between the first electronic device and the second electronic device, which only the first electronic device and the second electronic device can know. An operation for generating the encryption key will be described below with reference to FIG. 12.

In operation 513, the first electronic device may generate the encryption key by using the information related to the first communication previously performed between the first electronic device and the second electronic device.

In operation 515, the first electronic device may encrypt at least one of the information related to the second communication by the generated encryption key or the identified encryption key. In operation 517, the first electronic device may transmit the at least partially encrypted second communication information to the second electronic device. Referring to FIGS. 7 and 8, since the second button 75 is selected, the first electronic device may encrypt at least one of the second communication information in a second input window 81 for receiving information, and, when the user selects a third button 82 for transmitting a message, may send the secret message including the at least partially encrypted information related to the second communication. Further, the first electronic device may perform an operation for encrypting at least one of the information related to the second communication when the third button 82 for transmitting a message is selected.

Next, an operation process of the second electronic device, which is a receiving side electronic device, will be described.

Figure 9:
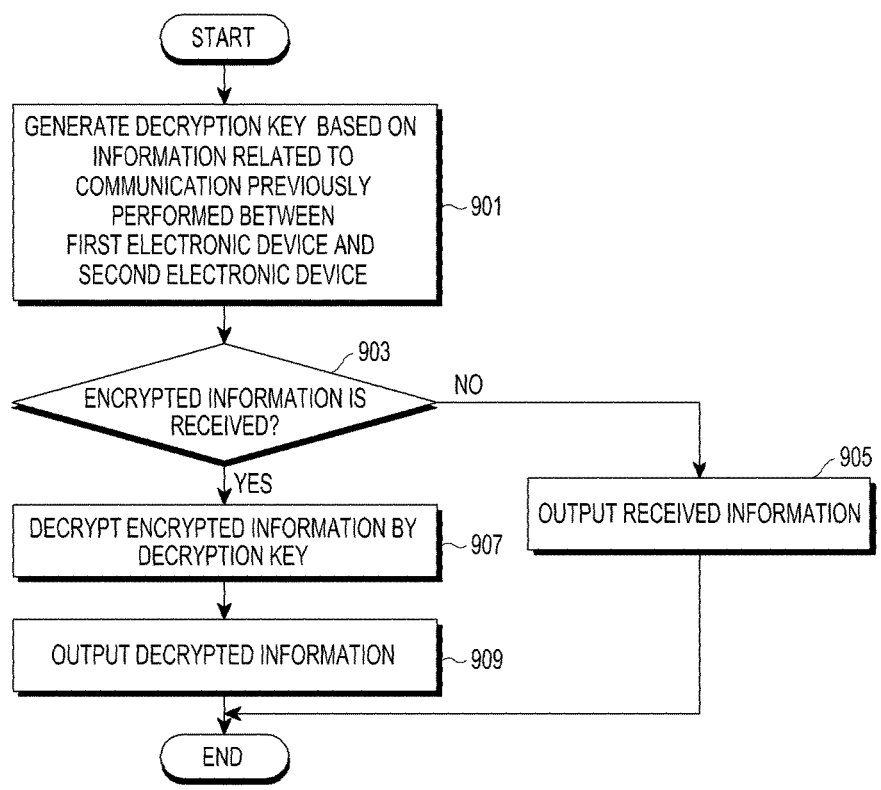
FIG. 9 illustrates a flowchart of a process to receive encrypted information according to various embodiments of the present disclosure.

FIG. 9 illustrates a flowchart of a process to receive encrypted information according to various embodiments of the present disclosure.

Referring to FIG. 9, in operation 901, the second electronic device may generate an encryption key by using the information related to the first communication performed between the first electronic device and the second electronic device. In operation 901, when an encryption key exists, the second electronic device may identify sender information and read the previously generated encryption key from the storage unit 240.

In operation 903, the second electronic device may identify whether encrypted information (for example, at least partially encrypted information related to the second communication) is received from the first electronic device. When the encrypted information is not received in operation 903, the second electronic device may display information included in the received message on the display unit in operation 905. When sound source information is included in the received message, the second electronic device may output the sound source information through, for example, a speaker.

Referring back to operation 903, when the encrypted information is received, the second electronic device may decrypt the encrypted information by the encryption key in operation 907. The second electronic device may display the decrypted information on the display unit 230 in operation 909. When sound source information is included in the encrypted information, the second electronic device may output the sound source information through, for example, a speaker.

Figure 10:
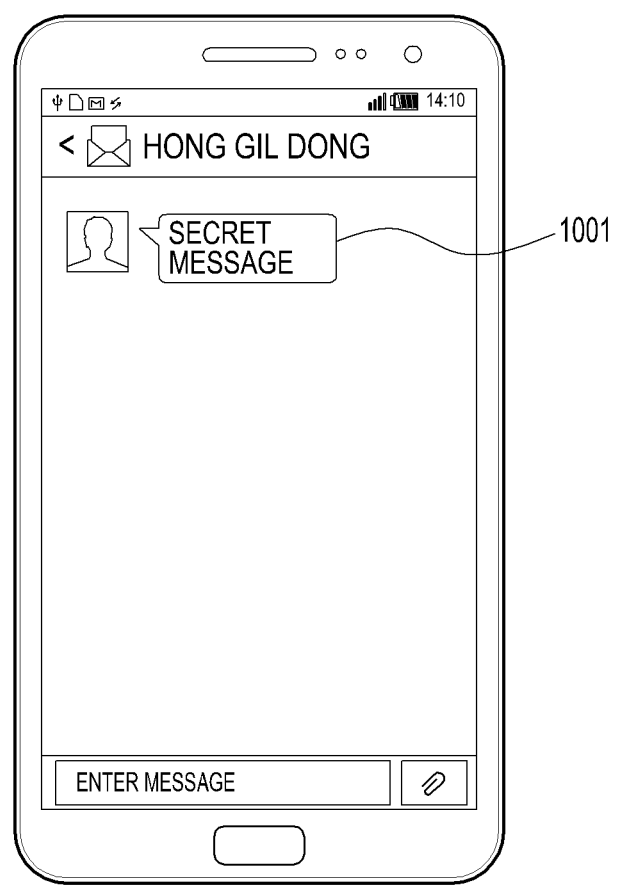
FIG. 10 illustrates a screen example for information transmission by the second electronic device according to various embodiments of the present disclosure.
Figures 11A, 11B:
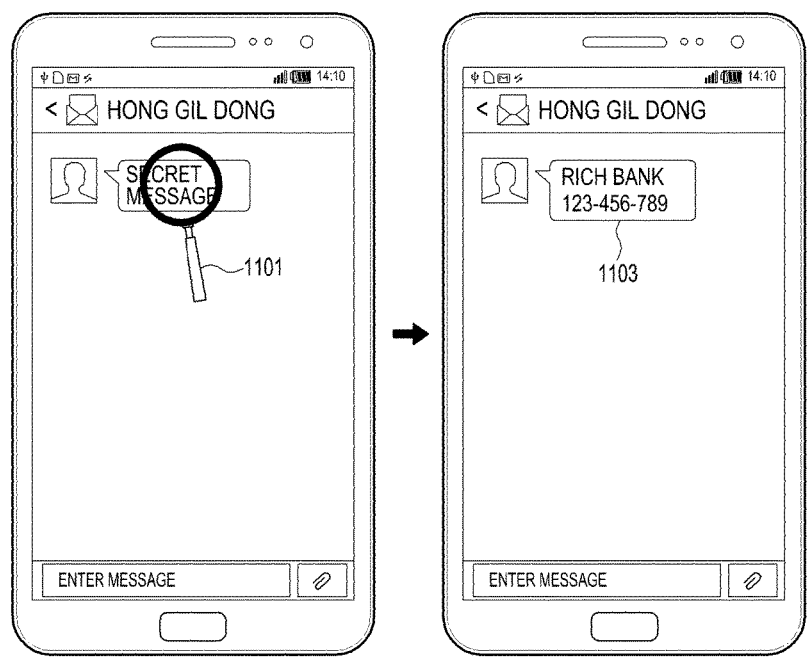
FIGS. 11A and 11B illustrate a screen example for information transmission by the second electronic device according to various embodiments of the present disclosure.

FIGS. 10, 11A, and 11B illustrate examples of screens to receive encrypted information according to various embodiments of the present disclosure.

Referring to FIG. 10, the second electronic device may execute an application related to message transmission/reception to display a service execution screen and display a secret message 1001 including the received encrypted information on the service execution screen. Further, in order to decrypt the secret message, the second electronic device may select at least one of an image, an icon, or a menu for identifying the secret message by the user or detect a particular user action (for example, at least one of click (or touch) on the secret message by the particular number of times, particular motion, drag and drop, and swipe). Referring to FIGS. 11A and 11B, the second electronic device may display a magnifying glass shaped image 1101 when the secret message is received. When the user drags the magnifying glass shaped image 1101 to the secret message, the second electronic device may decrypt encrypted information in the secret message and display the decrypted information 1103 (for example, "rich bank 123-456-789") on the service execution screen FIG. 12 illustrates a process for generating an encryption key according to various embodiments of the present disclosure.

Figure 12:
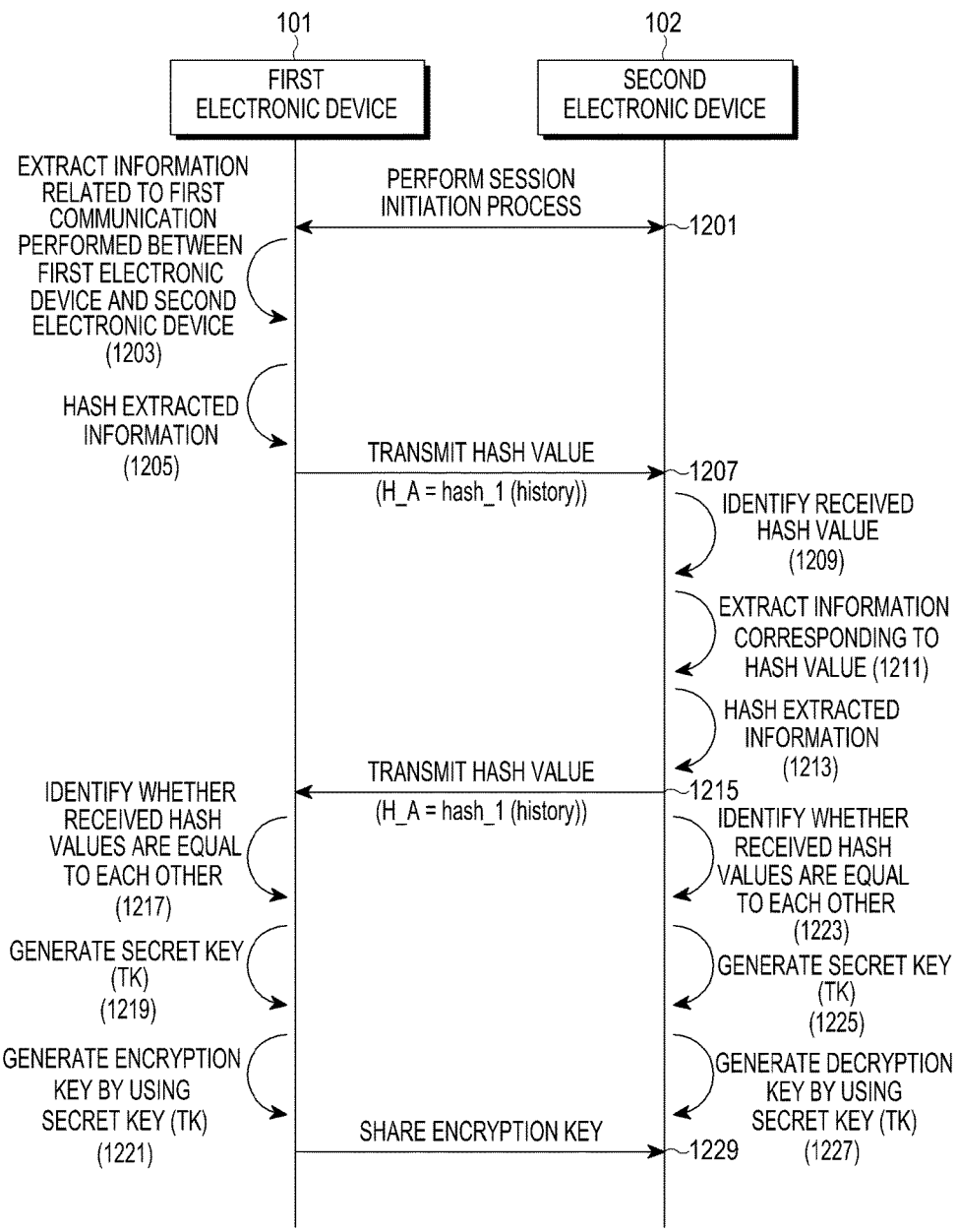
FIG. 12 illustrates a process for generating an encryption key according to various embodiments of the present disclosure.

Referring to FIG. 12, in operation 1201, the first electronic device 101 may perform a session initiation process for sharing the information related to the first communication with the second electronic device 102.

When the session is initiated and the first electronic device 101 is connected to the second electronic device 102, in operation 1203, the first electronic device 101 may search for a history file including the first communication performed between the first electronic device 101 and the second electronic device 102 and extract the information related to the first communication. The extracting of the information related to the first communication may include extracting the information related to the first communication according to a preset condition by using recipient information or extracting information related to recipient information randomly. The first electronic device 101 may set a condition for extracting the information related to the first communication based on, for example, a transmitted/received text message log (for example, short message service (SMS)), a social network service log, a call log, an initial or last call time and/or an e-mail log. The set condition may be set by the user in an environment setting of at least one application enabling secret communication. When extracting the information related to the first communication corresponding to the set condition as recipient information, the first electronic device 101 may extract information (for example, information included in a last text message) according to the set condition (for example, the last text message) in the first communication performed most recently.

In operation 1205, the first electronic device 101 may hash the extracted information related to the first communication. In operation 1207, the first electronic device 101 may transmit a hash value (for example, H_A=hash_1(history)) acquired through a hash operation to the second electronic device 102.

In operation 1209, the second electronic device 102 may analyze the received hash value to identify the hash value, that is, the hashed information related to the first communication. In operation 1211, the second electronic device 102 may identify sender information and extract information corresponding to the hash value, that is, the identified information related to the first communication by using the identified sender information. The second electronic device 102 may identify the sender information, search for the information related to the first communication performed between the first electronic device 101 and the second electronic device 102 based on the identified sender information, and extract information corresponding to the hash value from the searched information.

In operation 1213, the second electronic device 102 may hash the extracted information. In operation 1215, the second electronic device 102 may transmit a hash value (for example, H_B=hash_1(history)) acquired by hashing the extracted information to the first electronic device 101.

In operation 1217, it may be determined whether the hash value received by the first electronic device 101 and the hash value transmitted to the second electronic device 102 are the same. When the two hash values are the same based on a result of the determination, the first electronic device 101 may generate a secret key (for example, temporary_key(TK)=hasy_2(history)) by using the hash value, that is, the extracted information related to the first communication in operation 1219. In operation 1221, the first electronic device 101 may generate an encryption key (for example, a shared secret key (SSK)) through a key exchange protocol based on the generated secret key (TK) corresponding to a master secret key.

In operation 1223, it may be determined whether the hash value of the second electronic device 102 and the hash value received by the first electronic device 101 are the same. When the two hash values are the same based on a result of the determination, the second electronic device 102 may generate a secret key (for example, temporary_key(TK)=hasy_2(history)) by using the hash value of the second electronic device 102, that is, the extracted information related to the first communication in operation 1225. In operation 1227, the second electronic device 102 may generate a decryption key (for example, a SSK) through a key exchange protocol based on the generated secret key (TK) corresponding to a master secret key. The decryption key may be a key identical to the encryption key generated by the first electronic device 101 or a key related to the encryption key.

In operation 1229, the first electronic device 101 and the second electronic device 102 may share the generated encryption key and decryption key. The first electronic device 101 and the second electronic device 102 may share the encryption key and the decryption key without a separate authentication process or the aid of infrastructure.

Further, the first electronic device 101 and the second electronic device 102 may periodically generate the encryption key or remove the generated encryption key after a predetermined time or after information transmission/reception is completed. A period on which the encryption key is generated may be set differently according to an applied service.

A method of operating a first electronic device according to one of the various embodiments of the present disclosure may include identifying information related to a first communication performed between the first electronic device and a second electronic device, encrypting at least a part of information related to the second communication based on the identified information related to the first communication, and making a control to transmit the second communication information to the second electronic device.

The secret information may be at least one of text information, an image, a dynamic image, sound source information, location information, and address book information in the method.

The information related to the first communication of the first electronic device may be included in at least one of all or at least a part of call data, a call start time, a call end time, a call time, all or at least a part of transmitted or received messages, and all or at least a part of email in the method.

The identifying of the information related to the first communication performed between the first electronic device and the second electronic device in the method may include extracting the information related to the first communication based on information on the second electronic device, transmitting a first hash value generated by hashing the extracted information related to the first communication to the second electronic device, receiving a second hash value from the second electronic device, and generating an encryption key for encrypting at least a part of the information related to the second communication based on the information related to the first communication when the received second hash value and the first hash value are equal.

The encrypting of at least the part of the information related to the second communication based on the identified information related to the first communication in the method may include receiving the information related to the second communication, and encrypting the information related to the second communication input before secret communication is released by a generated encryption key based on the information related to the first communication when the secret communication is requested while the information related to the second communication is received.

The encrypting of at least the part of the information related to the second communication based on the identified information related to the first communication in the method may include, when the information related to the first communication is text information, identifying at least one sentence including a set word in the received or stored text information and encrypting the at least one identified sentence by a generated encryption key based on the information related to the first communication.

The encrypting of at least the part of the information related to the second communication based on the identified information related to the first communication in the method may include, when the information related to the first communication is an image, receiving a selection of a part of areas of the image and encrypting the selected area by a generated encryption key based on the information related to the first communication.

The encrypting of at least the part of the information related to the second communication based on the identified information related to the first communication in the method may include, when the information related to the first communication is a dynamic image, receiving a selection of a part of reproduction sections in the dynamic image and encrypting the selected reproduction section by a generated encryption key based on the information related to the first communication.

The method may further include receiving at least partially encrypted information related to the second communication from the second electronic device and decrypting the received information related to the second communication based on the information related to the first communication.

A method of operating a second electronic device according to one of the various embodiments of the present disclosure may include identifying information related to a first communication performed between a first electronic device and the second electronic device, receiving at least partially encrypted information related to the second communication from the first electronic device, and decrypting the received information related to the second communication based on the identified information related to the first communication.

The method may further include displaying the received second communication information such that at least an encrypted part of the second communication information cannot be identified and, when at least the encrypted part is decrypted, displaying the information related to the second communication such that at least the encrypted part can be identified.

The identifying of the information related to the first communication performed between the first electronic device and the second electronic device in the method may include receiving a first hash value generated by hashing the information related to the first communication from the first electronic device, extracting the information related to the first communication corresponding to the received first hash value, transmitting a second hash value acquired by hashing the extracted information related to the first communication to the first electronic device, and, when the first hash value and the second has value are equal to each other, generating a decryption key for decrypting the information related to the second communication based on the extracted information related to a first communication.

Various embodiments of the present disclosure will be described based on the configuration and operation of the electronic device as described above. Hereinafter, for the convenience of description, the first electronic device 101 will be described as the transmitting party and the second electronic device 102 will be described as the receiving party. According to various embodiments of the present disclosure, after a request for secret communication, the information related to the second communication is referred to as secret information. According to various embodiments of the present disclosure, information to be transmitted to the second electronic device without encryption (for example, information related to the second communication) is referred to as transmission information.

Figure 13:
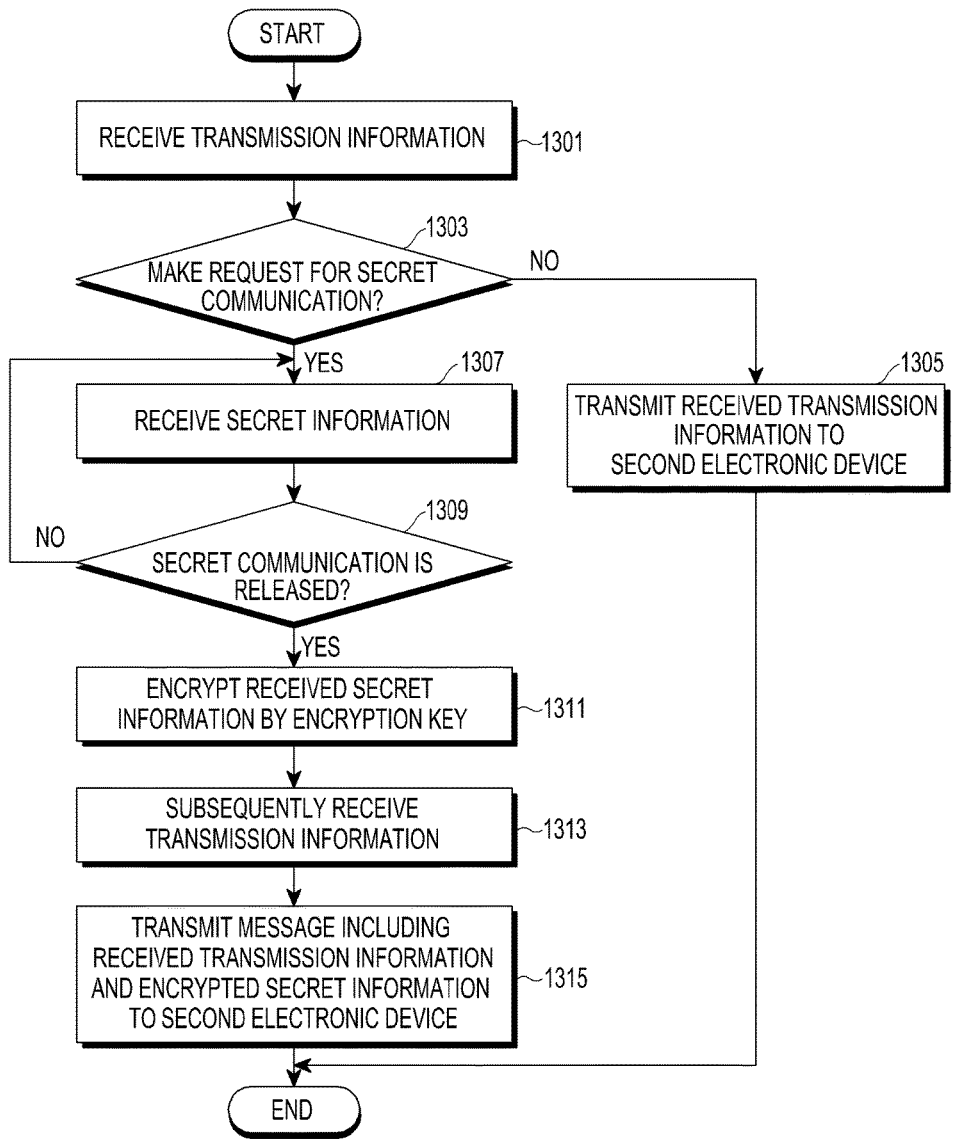
FIG. 13 illustrates a flowchart of a process to transmit encrypted information according to various embodiments of the present disclosure.
Figure 14:
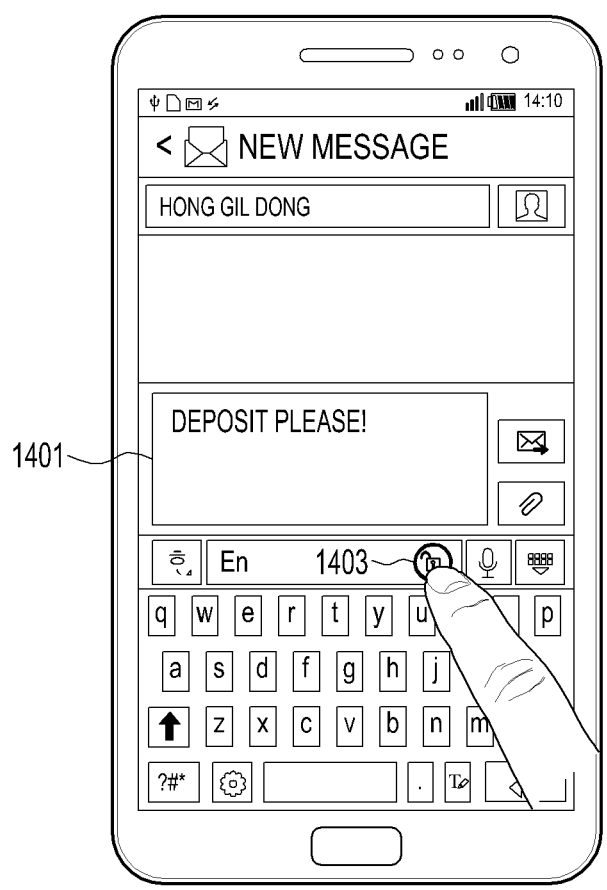
FIGS. 14, 15, and 16 illustrate example screens to transmit encrypted information according to various embodiments of the present disclosure.
Figure 15:
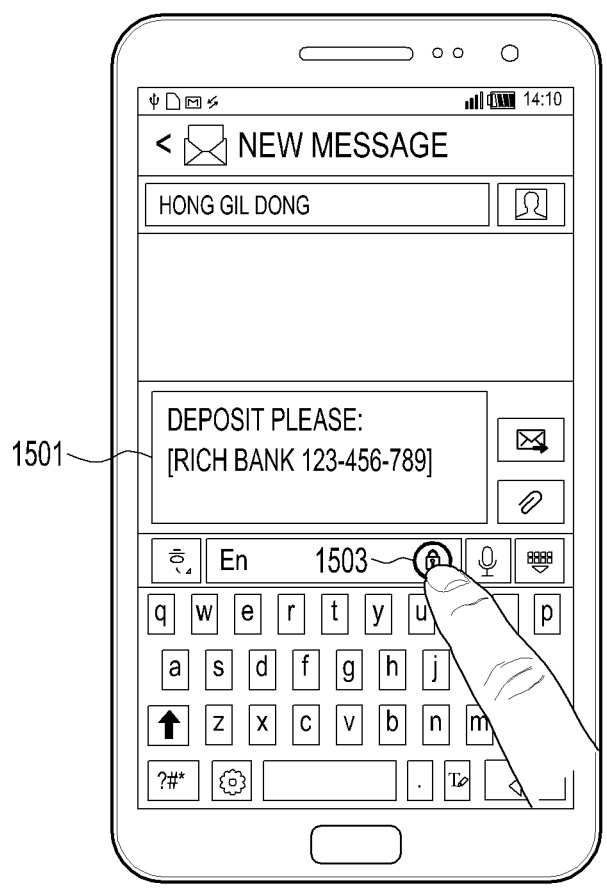
Figure 16:
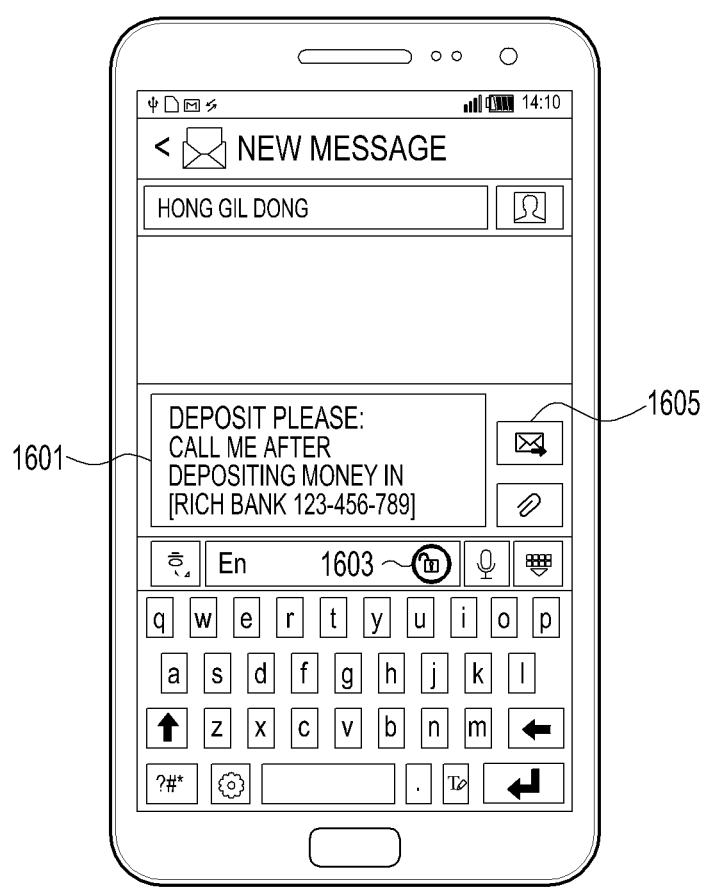

FIG. 13 illustrates a flowchart of a process to transmit encrypted information according to various embodiments of the present disclosure, and FIGS. 14, 15, and 16 illustrate example screens to transmit encrypted information according to various embodiments of the present disclosure.

Referring to FIG. 13, the first electronic device may receive transmission information from the user in operation 1301. Referring to FIG. 14, the first electronic device may receive information related to the second communication, that is, transmission information (for example, "deposit please!") from the user through a second input window 1401 and display the transmission information in an area of the second input window 1401.

Referring back to FIG. 13, in operation 1303, the first electronic device may identify whether there is a secret communication request. For example, referring to FIGS. 14 and 15, when the user selects a button 1403 for secret communication, the first electronic device may switch to the secret communication and display an image of a second button 1503.

Referring back to FIG. 13, when there is no secret communication request in operation 1303, the first electronic device may transmit transmission information (for example, previously input information related to the second communication and information related to the second communication input later) in operation 1303.

When there is the secret communication request in operation 1303, the first electronic device may receive information, which is input later or extracted from the storage unit (for example, information related to the second communication) as the secret information in operation 1307. Referring to FIG. 15, the first electronic device may display, on an area of the second input window 1501, secret information (for example, "rich bank 123-456-789") input after the transmission information (for example, "deposit please!") which has been previously input through the second input window 1501. Referring back to FIG. 13, when there is no encryption key which the first electronic device shares with the second electronic device in operation 1307, the first electronic device may generate the encryption key as described above with reference to FIG. 12.

In operation 1309, the first electronic device may identify whether the secret communication is released. When the secret communication is not released based on a result of the identification, the first electronic device may continue to perform operation 1307.

When the secret communication is released in operation 1309, the first electronic device may encrypt the input secret information by the encryption key in operation 1311. Referring to FIGS. 15 and 16, when the user selects the second button 1503, the first electronic device may release the secret communication and may display an image of a second button 1603 to indicate the release of the secret communication. Further, the first electronic device may distinguish the encrypted secret information displayed in an area of a second input window 1601 from transmission information, which is not encrypted, through a particular format (e.g., at least one of a highlight, shadow, symbol, and color).

Referring back to FIG. 13, in operation 1313, the first electronic device may receive transmission information successively. Referring to FIG. 16, the first electronic device may receive transmission information (for example, "call me after deposit") subsequently after the previously input transmission information (for example, "deposit, please!") and secret information (for example, "rich bank 123-456-789") through the second window 1601 and display the input transmission information continuously in the area of the second input window 1601.

Referring back to FIG. 13, in operation 1315, the first electronic device may transmit the input transmission information and the encrypted secret information to the second electronic device. Referring to FIG. 16, when the user selects a third button 1605 for transmitting a message, the first electronic device may transmit a message (for example, a text message) including the transmission information, which is not encrypted, and the encrypted secret information to the second electronic device.

Figure 17:
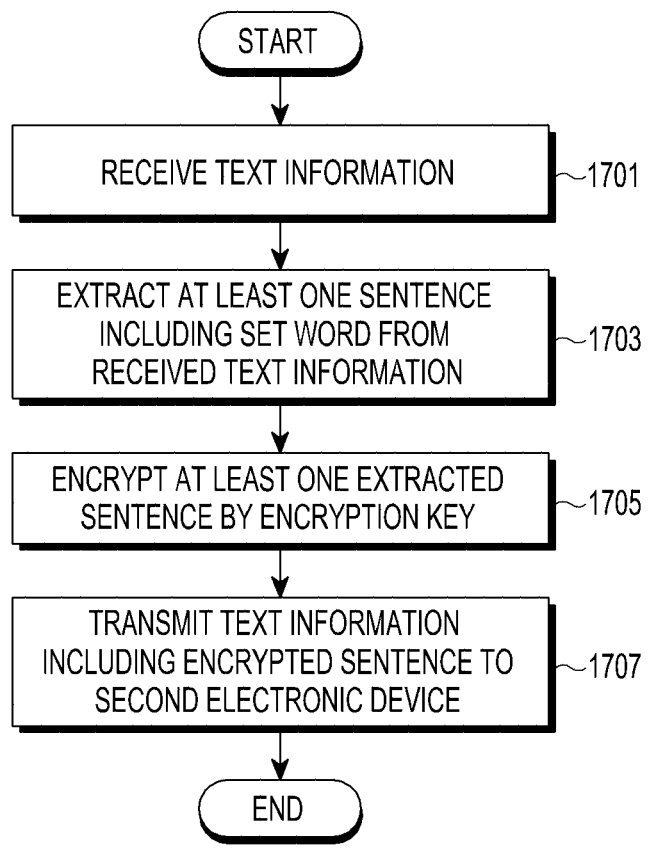
FIG. 17 illustrates a flowchart of a process to transmit encrypted information according to various embodiments of the present disclosure.
Figure 18:
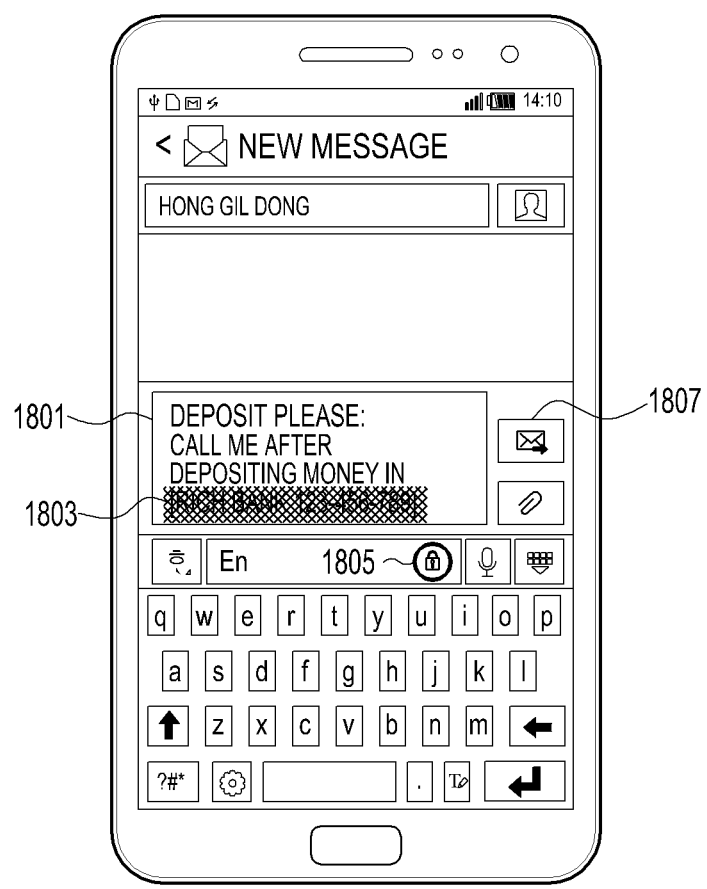
FIGS. 18, 19, and 20 illustrate example screens to transmit and receive encrypted information according to various embodiments of the present disclosure.
Figure 19:
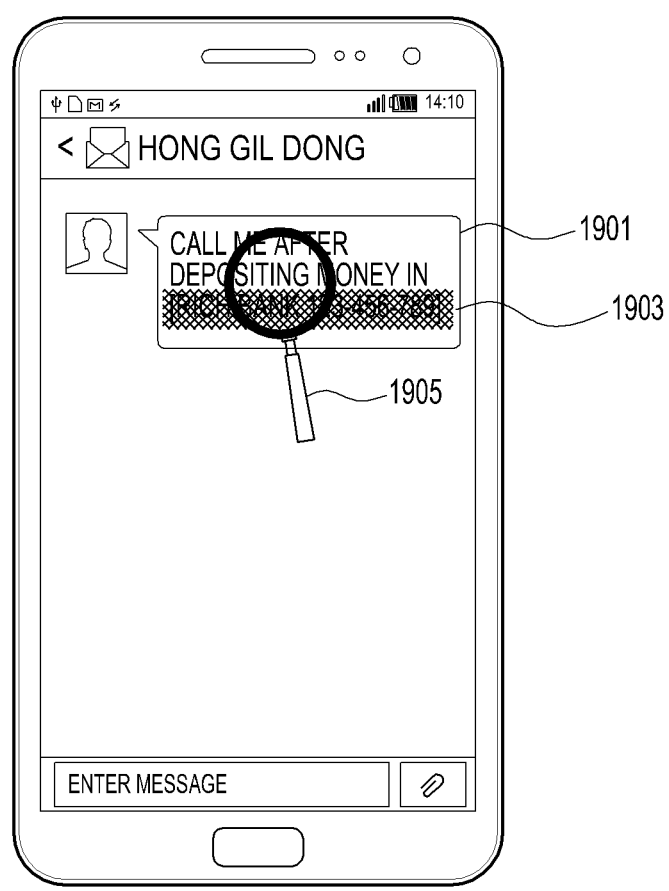
Figure 20:
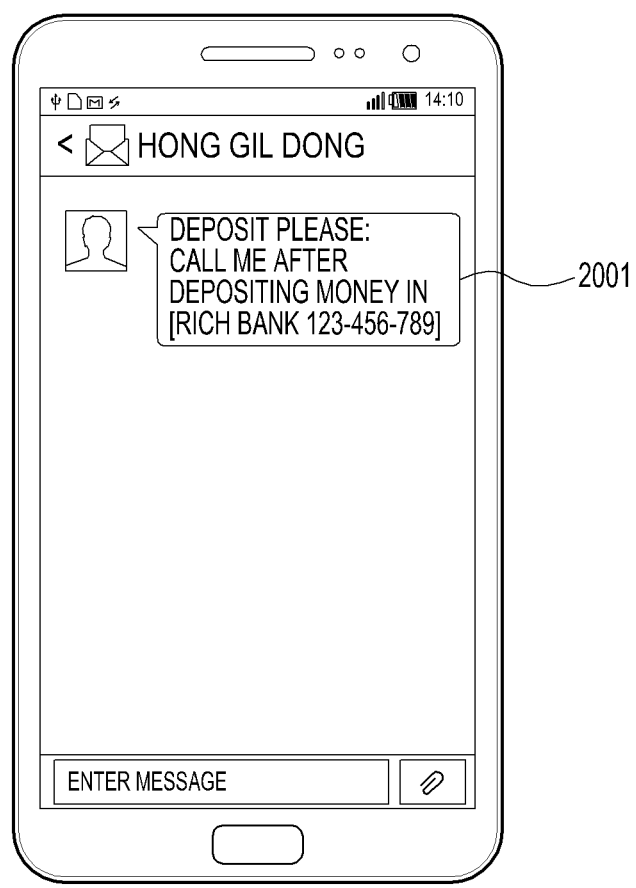

FIG. 17 illustrates a flowchart of a process to transmit encrypted information according to various embodiments of the present disclosure, FIGS. 18, 19 and 20 illustrate example screens to transmit and receive encrypted information according to various embodiments of the present disclosure.

Referring to FIG. 17, in operation 1701, the first electronic device may receive information (for example, information related to a second communication) to be transmitted to the second electronic device as text information according to various embodiments of the present disclosure. Referring to FIG. 18, the first electronic device may receive text information (for example, "deposit please! Call me after depositing money in Rich bank 123-456-789") from the user and display the text information in an area of the second input window 1801. Further, the first electronic device may display an image of a button 1805 (for example, the second button) for the secret communication displayed on the service execution screen to indicate that the secret communication is requested.

Referring back to FIG. 17, in operation 1703, the first electronic device may extract at least one sentence including a set word from the input text information. Referring back to FIG. 18, the first electronic device may extract at least one sentence 1803 (for example, "rich bank 123-456-789") including a set word (for example, at least one of a bank, account, password, passport number, and resident registration number) and related words before and after the set word from the input text information (for example, "deposit please! Call me after depositing money in Rich bank 123-456-789"). The first electronic device may distinguish the extracted sentence 1803 from the transmission information, which is not encrypted, through a particular sign (at least one of making a highlight, shadow, symbol, and color) to encrypt the sentence 1803. The first electronic device may control the user to select (for example, touch or drag) a word to be removed from or to be added to the extracted sentence displayed in the area of the second input window 1801. When a button 1805 for secret communication selected to release the secret communication, the first electronic device may display the automatically extracted sentence.

Referring back to FIG. 17, in operation 1705, the first electronic device may encrypt at least one extracted sentence by the encryption key. When there is no encryption key generated using the information related to the first communication performed between the first electronic device and the second electronic device, the first electronic device may generate the encryption key when the secret communication is requested or in operation 1705.

In operation 1707, the first electronic device may transmit a message (for example, a text message) of text information including the encrypted sentence to the second electronic device. Referring to FIG. 18, when a third button 1807 for transmitting a message is selected by the user, the first electronic device may transmit text information including sentences, which are not encrypted, to the second electronic device.

When the second electronic device receives the text information including the encrypted sentence, the second electronic device may display the received text information on the service execution screen of the display (for example, the display unit 230 of FIG. 2). For example, referring to FIG. 19, the second electronic device may display the encrypted sentence such that the secret information 1903 cannot be perceived in a message display window 1901. Referring to FIGS. 19 and 20, when a decryption request, for example, a magnifying glass image 1905 is dragged to the secret information 1903, the second electronic device may decrypt the encrypted secret information and display entire message contents 2001 including the decrypted sentence (for example, "rich bank 123-456-789"). When the second electronic device receives a message, the second electronic device may immediately decrypt the encrypted sentence included in the received message by using the encryption key without a request from the user, and then display the decrypted sentence.

Although the text information has been described as an example in the operation process of FIG. 17 for the convenience of description, the operation process may be applied to a case where a dynamic image, sound source information or an image is input as well as the text information. In a case of the dynamic image or the sound source information, the first electronic device may output the decrypted sentence as a sound source through a sound source output unit (not shown) or convert the decrypted sentence into a text message and display the text message on the display (for example, the display unit 230 of FIG. 2).

Figure 21:
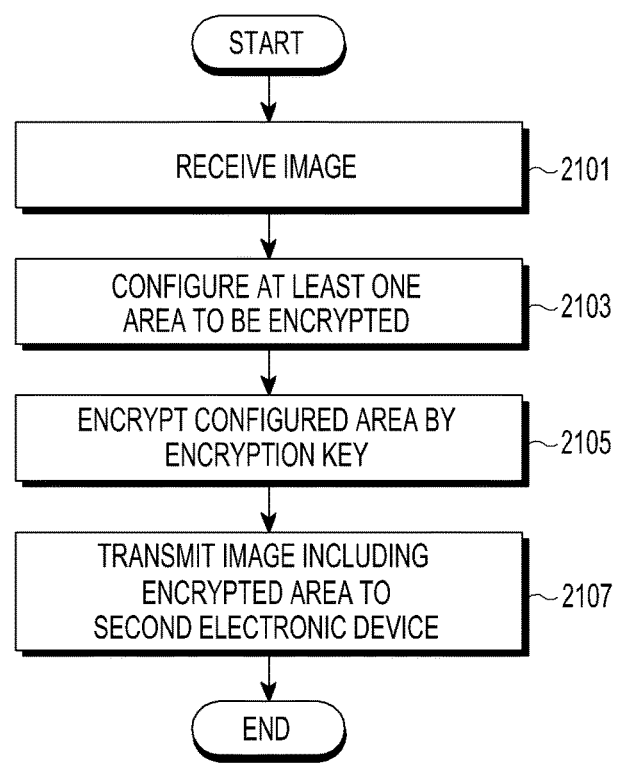
FIG. 21 illustrates a flowchart of a process to encrypt an image according to various embodiments of the present disclosure.
Figure 22:
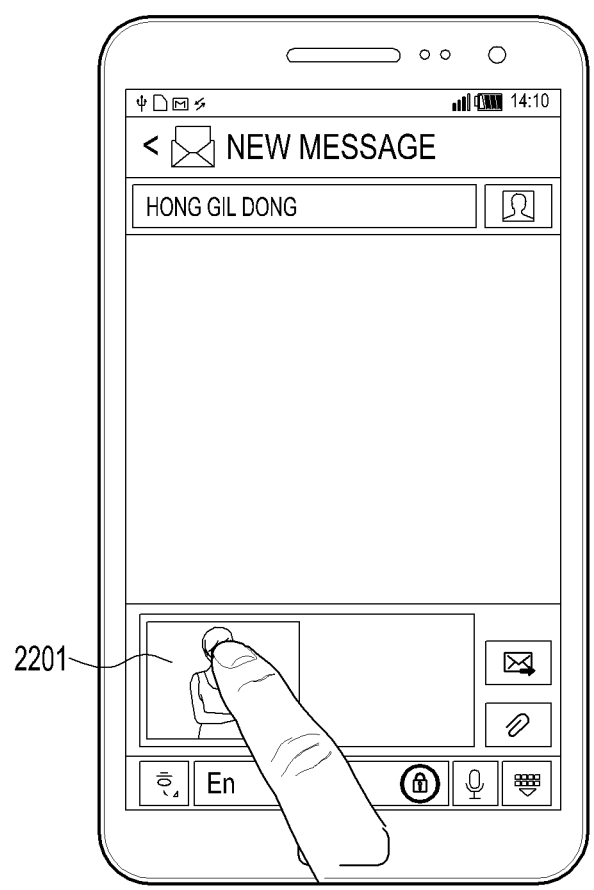
FIGS. 22, 23A, and 23B illustrate example screens to encrypt and decrypt an image according to various embodiments of the present disclosure.
Figures 23A, 23B:
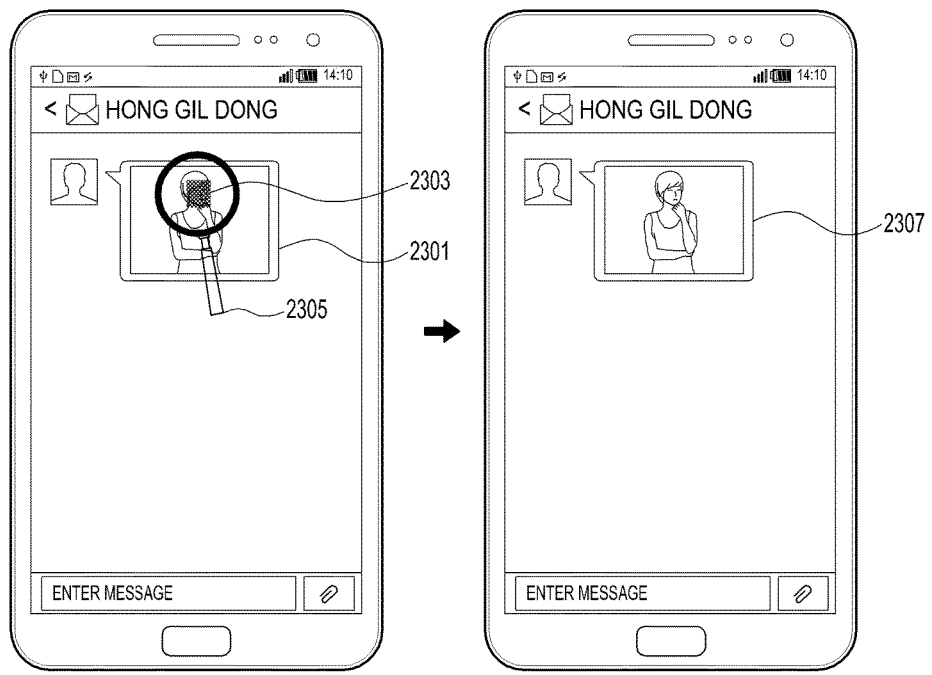

FIG. 21 illustrates a flowchart of a process to encrypt an image according to various embodiments of the present disclosure, and FIGS. 22, 23A, and 23B illustrate example screens to encrypt and decrypt an image according to various embodiments of the present disclosure.

Referring to FIG. 21 in operation 2101, the first electronic device may receive information (for example, information related to a second communication) to be transmitted to the second electronic device as an image according to various embodiments of the present disclosure. Referring to FIG. 22, the first electronic device may receive an image 2201 from the user through the second input window displayed on the service execution screen of the display (for example, the display unit 230 of FIG. 2) and display the image 2201 in the area of the second input window. Further, the first electronic device may display an image of a button (for example, the second button) for the secret communication displayed on the service execution screen to indicate a state where the secret communication is requested.

Referring back to FIG. 21, in operation 2103, the first electronic device may configure the area selected by the user as at least one area to be encrypted. Referring to FIG. 22, when the user selects a particular area (for example, a face) in the displayed image 2201 as illustrated in FIG. 22, the first electronic device may configure the selected particular area as the area to be encrypted. The configuration of the area to be encrypted may be selected by the user or performed through a program or an application for image analysis (for example, a face recognition program or application).

Referring back to FIG. 21, in operation 2105, the first electronic device may encrypt the configured area by the encryption key. In operation 2107, the first electronic device may transmit the image including the encrypted area to the second electronic device.

The second electronic device, having received the message including the image, may decrypt the encrypted area of the image and display the area on the service execution screen of the display (for example, the display unit 230 of FIG. 2). Referring to FIG. 23A, the second electronic device may display a message 2301 including the image on the service execution screen and the encrypted area 2303 may be processed by, for example, a mosaic so that the encrypted area 2303 cannot be identified. Referring to FIGS. 23A and 23B, when a decryption request, for example, a magnifying glass image 2305 is dragged to the encrypted area 2303, the encrypted area 2303 of the image is touched, or a particular button is selected, the second electronic device may decrypt the encrypted area and display an original image 2307.

Although the image has been described as an example, the operation process may be applied to a case where a dynamic image including image information is input as well as the image.

Figure 24:
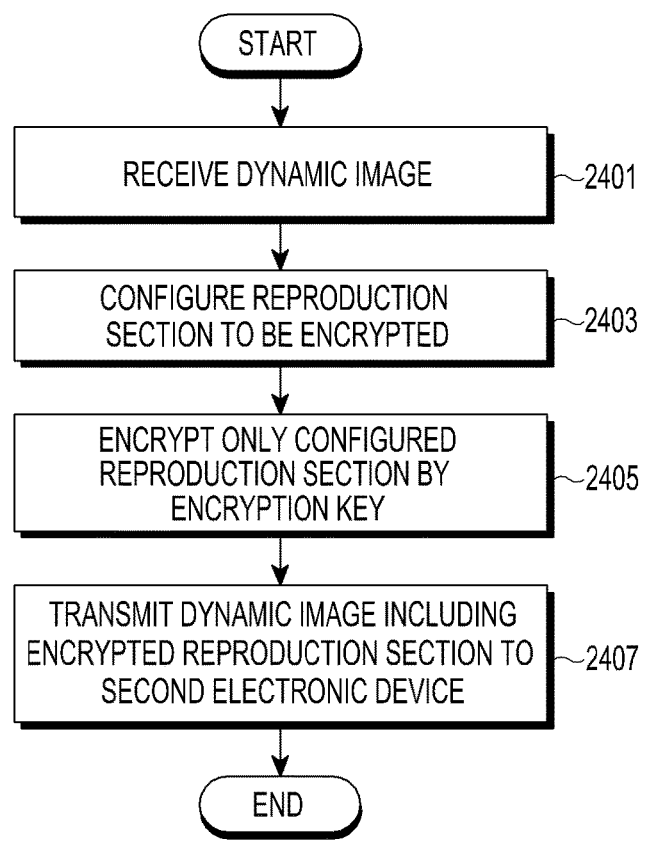
FIG. 24 illustrates a flowchart of a process to transmit a dynamic image according to various embodiments of the present disclosure.
Figures 25A, 25B:
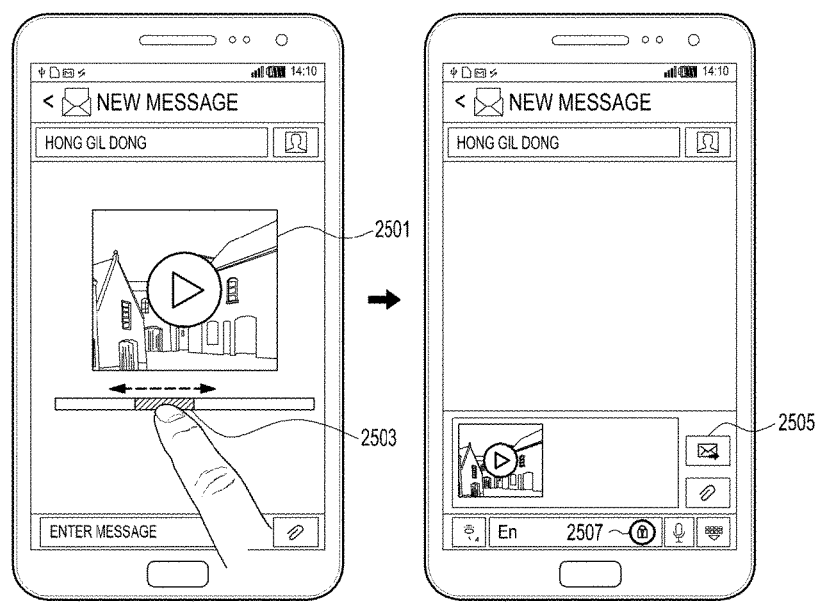
FIGS. 25A and 25B illustrate example screens to receive the encrypted dynamic image according to various embodiments of the present disclosure.

FIG. 24 illustrates a flowchart of a process to transmit a dynamic image according to various embodiments of the present disclosure, and FIGS. 25A and 25B illustrate example screens to receive the encrypted dynamic image according to various embodiments of the present disclosure.

Referring to FIG. 24, in operation 2401, the first electronic device may receive information (for example, information related to a second communication) to be transmitted to the second electronic device as a dynamic image or extract a dynamic image stored in the storage unit. Referring to FIG. 25A, the first electronic device may display a received or extracted dynamic image 2501 on the service execution screen of the display (for example, the display unit 230 of FIG. 2). Further, according to various embodiments, the first electronic device may display an image of a button 2507 (for example, the second button) for the secret communication to indicate that a secret communication is requested.

Referring back to FIG. 24, in operation 2403, the first electronic device may configure a reproduction section, which is to be encrypted, selected by the user. Referring to FIG. 25A, when the user selects a reproduction section 2503 of a displayed dynamic image 2501, the first electronic device may configure the selected particular area as the reproduction section to be encrypted.

Referring back to FIG. 24, in operation 2405, the first electronic device may encrypt the configured reproduction section by the encryption key. In operation 2407, the first electronic device may transmit the dynamic image including the encrypted reproduction section to the second electronic device. Referring to FIGS. 25A and 25B, the first electronic device may display the dynamic image including the encrypted reproduction section in the second input window, and, when a third button 2505 for transmitting a message is selected, may transmit a message of the dynamic image including the encrypted reproduction section to the second electronic device.

According to various embodiments of the present disclosure, the second electronic device may display the message of the dynamic image including the encrypted reproduction section on the service execution screen, and when the dynamic image is reproduced according to a dynamic image execution request, may process the encrypted reproduction section by, for example, at least one of mosaic and mute and reproduce the dynamic image.

According to various embodiments of the present disclosure, the second electronic device may decrypt the encrypted reproduction section according to a user's request (for example, touching the displayed dynamic image or selecting a particular button). When the encrypted reproduction section is reproduced, the second electronic device may inform that there is the encrypted reproduction section through, for example, a popup window and identify the encrypted reproduction section, that is, inquire about whether to decrypt the encrypted reproduction section. When the user identifies the inquiry about the decryption and makes a request for the decryption the second electronic device may decrypt the encrypted reproduction section and reproduce the dynamic image of the decrypted reproduction section. When the user reproduces the displayed dynamic image or receives a dynamic image, the second electronic device may decrypt the encrypted reproduction section and reproduce the dynamic image including the decrypted reproduction section.

According to various embodiments of the present disclosure, when the first electronic device performs group communication, the first electronic device may generate an encryption key by using information related to the first communication performed between the first electronic device and the second electronic device and encrypt secret information (for example, at least one of the information related to the second communication) to be transmitted, by the generated encryption key. Accordingly, at least one third electronic device to perform the group communication cannot know the generated encryption key.

The first electronic device may simultaneously transmit a message including the encrypted secret information to the second electronic device and a third electronic device.

The second electronic device and the third electronic device, having received the message, may display the received message and identify whether the encrypted secret information included in the message can be decrypted. Since the second electronic device shares the encryption key with the first electronic device, the second electronic device may decrypt the secret information and display the decrypted information. However, since the third electronic device cannot know the encryption key shared between the first electronic device and the second electronic device, the third electronic device cannot decrypt the secret information and thus cannot identify the secret information.

Figure 26:
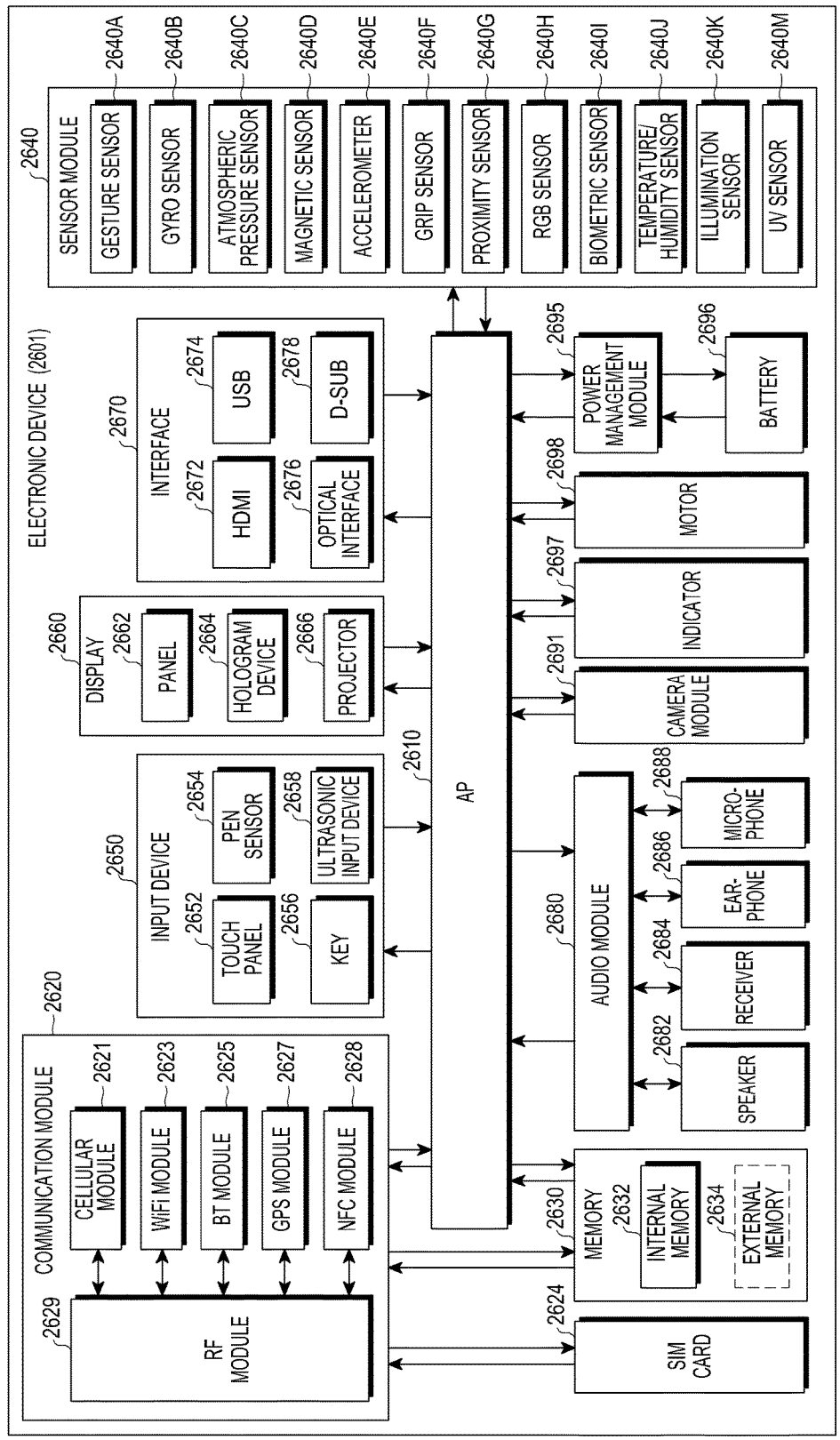
FIG. 26 illustrates a block diagram of an electronic device according to various embodiments of the present disclosure.

FIG. 26 illustrates a block diagram of an electronic device according to various embodiments of the present disclosure.

Referring to FIG. 26, the electronic device 2601 may constitute, for example, all or a part of the electronic device 101 or the electronic device 102 illustrated in FIG. 1. The electronic device 2601 may include at least one AP 2610, a communication module 2620, a subscriber identifier module (SIM) card 2624, a memory 2630, a sensor module 2640, an input device 2650, a display 2660, an interface 2670, an audio module 2680, a camera module 2691, a power management module 2695, a battery 2696, an indicator 2697, and a motor 2698.

The at least one AP 2610 may control a plurality of hardware or software components connected to the AP 2610 by driving an OS or an application program and perform a variety of data processing and calculations. The AP 2610 may be implemented by, for example, a system on chip (SoC). According to one embodiment, the AP 2610 may further include a graphic processing unit (GPU) and/or an image signal processor (ISP). The AP 2610 may also include at least some (for example, a cellular module 2621) of the components illustrated in FIG. 26. At least one AP 2610 may load instructions or data, received from at least one other element (for example, a non-volatile memory), in a volatile memory to process the loaded instructions or data and may store various types of data in a non-volatile memory.

The communication module 2620 may have components equal or similar to those of the communication unit 210 of FIG. 2. The communication module 2620 may include, for example, a cellular module 2621, a Wi-Fi module 2623, a BT module 2625, a GPS module 2627, an NFC module 2628, and a radio frequency (RF) module 2629.

The cellular module 2621 may provide a voice call, image call, SMS, or Internet service through, for example, a communication network. According to an embodiment, the cellular module 2621 may distinguish between and authenticate electronic devices 2601 within a communication network by using a subscriber identification module (for example, the SIM card 2624). According to an embodiment, the cellular module 2621 may perform at least some functions that at least one AP 2610 may provide. According to an embodiment, the cellular module 2621 may include a communication processor (CP).

The Wi-Fi module 2623, the BT module 2625, the GPS module 2627, and the NFC module 2628 may include, for example, a processor for processing data transmitted/received through the corresponding module. According to some embodiments, at least some (for example, two or more) of the cellular module 2621, the Wi-Fi module 2623, the BT module 2625, the GPS module 2627, and the NFC module 2628 may be included in one integrated chip (IC) or IC package.

The RF module 2629 may transmit/receive, for example, a communication signal (for example, an RF signal). The RF module 2629 may include, for example, a transceiver, a power amplifier module (PAM), a frequency filter, a low noise amplifier (LNA), or an antenna. According to another embodiment, at least one of the cellular module 2621, the Wi-Fi module 2623, the BT module 2625, the GPS module 2627, and the NFC module 2628 may transmit/receive an RF signal through a separate RF module.

The SIM card 2624 may include, for example, a card including a subscriber identification module and/or an embedded SIM, and may further include unique identification information (for example, an integrated circuit card identifier (ICCID)) or subscriber information (for example, international mobile subscriber identity (IMSI)).

The memory 2630 (for example, the storage unit 240) may include, for example, an internal memory 2632 or an external memory 2634. The internal memory 2632 may include at least one of, for example, a volatile memory (for example, a dynamic random access memory (DRAM), a static RAM (SRAM), a synchronous dynamic RAM (SDRAM), and the like) and a non-volatile memory (for example, a one time programmable read only memory (OTPROM), a programmable ROM (PROM), an erasable and programmable ROM (EPROM), an electrically erasable and programmable ROM (EEPROM), a flash memory (for example, a NAND flash memory or a NOR flash memory), a hard driver, or a Solid State Drive (SSD).

The external memory 2634 may further include a flash drive, for example, a compact flash (CF), an SD, a micro Secure digital (Micro-SD), a mini secure digital (Mini-SD), an eXtreme Digital (xD), a memory stick, or the like. The external memory 2634 may be functionally and/or physically connected to the electronic device 2601 through various interfaces.

For example, the sensor module 2640 may measure a physical quantity or may detect an operation state of the electronic apparatus 2601, and may convert the measured physical quantity or the detected operation state into an electrical signal. The sensor module 2640 may include, for example, at least one of a gesture sensor 2640A, a gyro sensor 2640B, an atmospheric pressure sensor 2640C, a magnetic sensor 2640D, an acceleration sensor 2640E, a grip sensor 2640F, a proximity sensor 2640G, a color sensor 2640H (for example, red, green, and blue (RGB) sensor), a biometric sensor 2640I, a temperature/humidity sensor 2640J, an illumination sensor 2640K, and an ultra violet (UV) sensor 2640M. Additionally or alternatively, the sensor module 2640 may include, for example, an E-nose sensor, an electromyography (EMG) sensor, an electroencephalogram (EEG) sensor, an electrocardiogram (ECG) sensor, an infrared (IR) sensor, an iris scanner, and/or a fingerprint sensor. The sensor module 2640 may further include a control circuit for controlling at least one sensor included therein. In some embodiments, the electronic device 2601 may further include a processor that is configured as a part of the AP 2610 or a separate element from the AP 2610 to control the sensor module 2640, thereby controlling the sensor module 2640 while the AP 2610 is in a sleep state.

The input device 2650 may include, for example, a touch panel 2652, a (digital) pen sensor 2654, a key 2656, or an ultrasonic input device 2658. The touch panel 2652 may use at least one of, for example, a capacitive type, a resistive type, an infrared type, and an ultrasonic type. The touch panel 2652 may further include a control circuit. The touch panel 2652 may further include a tactile layer and provide a tactile reaction to the user.

The (digital) pen sensor 2654 may include, for example, a recognition sheet which is a part of the touch panel or a separate recognition sheet. The key 2656 may include, for example, a physical button, an optical key or a keypad. The ultrasonic input unit 2658 may identify data by detecting an acoustic wave with a microphone (for example, microphone 2688) of the electronic device 2601 through an input unit for generating an ultrasonic signal.

The display 2660 (for example, the display 230 of FIG. 2) may include a panel 2662, a hologram device 2664, or a projector 2666. The panel 2662 may include the same or similar configuration to the display 230 illustrated in FIG. 2. The panel 2662 may be implemented to be, for example, flexible, transparent, or wearable. The panel 2662 may also be integrated with the touch panel 2652 as a single module. The hologram device 2664 may show a stereoscopic image in the air using interference of light. The projector 2666 may project light onto a screen to display an image. For example, the screen may be located inside or outside the electronic device 2601. According to an embodiment, the display 2660 may further include a control circuit for controlling the panel 2662, the hologram device 2664, or the projector 2666.

The interface 2670 may include, for example, an HDMI 2672, a USB 2674, an optical interface 2676, or a D-subminiature (D-sub) 2678. The interface 2670 may be included in, for example, the communication unit 210 illustrated in FIG. 2. Additionally or alternatively, the interface 2670 may include, for example, a mobile high-definition link (MHL) interface, a SD card/multi-media card (MMC) interface, or an infrared data association (IrDA) standard interface.

The audio module 2680 may bilaterally convert, for example, a sound and an electrical signal. At least some components of the audio module 2680 may be included in, for example, a sound source output unit (not shown). The audio module 2680 may process voice information input or output through, for example, a speaker 2682, a receiver 2684, earphones 2686, or the microphone 2688.

The camera module 2691 may photograph, for example, a still image or a moving image, and, according to one embodiment, may include one or more image sensors (for example, a front sensor or a rear sensor), a lens, an ISP, or a flash (for example, an LED or a xenon lamp).

The power management module 2695 may manage, for example, power of the electronic device 2601. According to an embodiment, the power management module 2695 may include a power management integrated circuit (PMIC), a charger integrated circuit (IC), or a battery or fuel gauge. The PMIC may have a wired and/or wireless charging scheme. A magnetic resonance scheme, a magnetic induction scheme, or an electromagnetic scheme may be exemplified as the wireless charging method, and an additional circuit for wireless charging, such as a coil loop circuit, a resonance circuit, a rectifier circuit, and the like may be added. The battery gauge may measure, for example, the remaining amount of battery, a charging voltage and current, or temperature. The battery 2696 may include, for example, a rechargeable battery and/or a solar battery.

The indicator 2697 may show a status of the electronic device 2601 or a part (for example, the AP 2610) of the electronic device 2601, for example, a booting status, a message status, a charging status and the like. The motor 2698 may convert an electrical signal into mechanical vibrations, and may generate a vibration or haptic effect. Although not illustrated, the electronic device 2601 may include a processing device (for example, a GPU) for supporting mobile television (TV). The processing unit for supporting mobile TV may process media data according to a standard of digital multimedia broadcasting (DMB), digital video broadcasting (DVB), media flow or the like.

Each of the components of the electronic device may be implemented by one or more components and the name of the corresponding component may vary depending on a type of the electronic device. In various embodiments, the electronic device may include at least one of the above-described elements. Some of the above-described elements may be omitted from the electronic device, or the electronic device may include additional elements. Further, some of the elements of the electronic device may be coupled to form a single entity while performing the same functions as those of the corresponding elements before the coupling.

Figure 27:
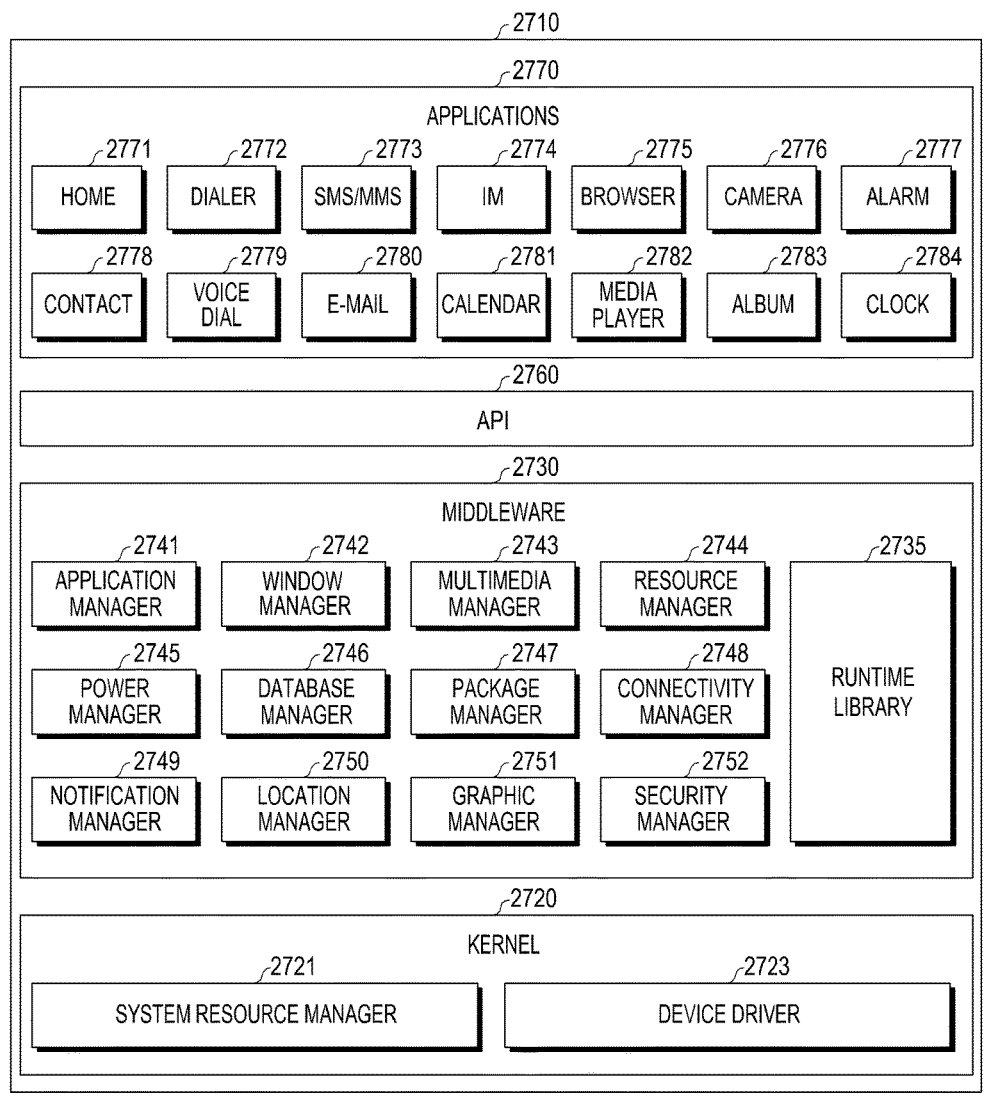
FIG. 27 illustrates a block diagram of a program module according to various embodiments of the present disclosure.

FIG. 27 illustrates a block diagram of a program module according to various embodiments of the present disclosure.

Referring to FIG. 27, a program module 2710 (for example, the program) may include an OS for controlling resources related to the electronic device (for example, the first electronic device 101 or the second electronic device 102 of FIG. 1) and/or various applications executed in the OS. The OS may be, for example, Android®, iOS®, Windows®, Symbian®, Tizen®, Bada®, or the like.

The program module 2710 may include a kernel 2720, a middleware 2730, an application programming interface (API) 2760, or applications 2770. At least one of the program module 2710 may be preloaded in the electronic device or downloaded from the server (for example, the server 103 of FIG. 1).

The kernel 2720 may include, for example, a system resource manager 2721 and a device driver 2723. The system resource manager 2721 may control, allocate, or collect the system resources. The system resource manager 2721 may include a process management unit, a memory management unit, or a file system management unit. The device driver 2723 may include, for example, a display driver, a camera driver, a BT driver, a shared-memory driver, a USB driver, a keypad driver, a Wi-Fi driver, an audio driver, or an inter-process communication (IPC) driver.

The middleware 2730 may provide a functions required by the applications 2770 or provide various functions to the applications 2770 through the API 2760 so that the applications 2770 can efficiently use system resources of the electronic device. According to an embodiment, the middleware 2730 may include at least one of a run time library 2735, an application manager 2741, a window manager 2742, a multimedia manager 2743, a resource manager 2744, a power manager 2745, a database manager 2746, a package manager 2747, a connectivity manager 2748, a notification manager 2749, a location manager 2750, a graphic manager 2751, and a security manager 2752.

The run time library 2735 may include, for example, a library module that a compiler uses in order to add new functions through a programming language while the applications 2770 are executed. The run time library 2735 may perform input/output management, memory management, or an arithmetic function.

For example, the application manager 2741 may manage a life cycle of at least one of the applications 2770. The window manager 2742 may manage a GUI resource used in the screen. The multimedia manager 2743 may detect a format required for reproducing various media files and encode or decode a media file using a codec appropriate for the corresponding format. The resource manager 2744 may manage resources, such as a source code, a memory, or a storage space, of at least one of the applications 2770.

The power manager 2745 may operate together with a basic input/output system (BIOS) to manage a battery or power and may provide power information required for the operation of the electronic device. The database manager 2746 may generate, search for, or change a database to be used by at least one of the applications 2770. The package manager 2747 may manage the installation or the updating of applications distributed in a package file form.

For example, the connectivity manager 2748 may manage wireless connections, such as Wi-Fi or BT. The notification manager 2749 may display or notify an event such as a received message, an appointment, and a proximity notification to a user without disturbance. The location manager 2750 may manage location information of the electronic device. The graphic manager 2751 may manage graphic effects provided to a user and user interfaces related to the graphic effects. The security manager 2752 may provide various security functions required for system security or user authentication. When the electronic device includes a telephone call function, the middleware 2730 may further include a telephony manager for managing a voice or video call function of the electronic device.

The middleware 2730 may include a middleware module for forming a combination of various functions of the aforementioned elements. The middleware 2730 may provide modules specialized according to the type of OS to provide differentiated functions. In addition, existing component elements may be dynamically removed from the middleware 2730, or new component elements may be added to the middleware 2730.

The API 2760 is a set of programming functions and may include different configurations according to the OS. For example, with respect to each platform, one API set may be provided in a case of Android® or iOS®, and two or more API sets may be provided in a case of Tizen®.

The applications 2770 may include, for example, one or more applications which can provide functions such as a home 2771, a dialer 2772, a SMS/MMS service 2773, an instant message (IM) service 2774, a browser 2775, a camera 2776, an alarm 2777, contacts 2778, a voice dialer 2779, an e-mail service 2780, a calendar 2781, a media player 2782, an album service 2783, a clock 2784, a health care service (for example, measure exercise quantity or blood sugar), or environmental information (for example, atmospheric pressure, humidity, or temperature information).

The applications 2770 may include an application (hereinafter, referred to as an "information exchange application" for convenience of the description) supporting information exchange between the electronic device (for example, the first electronic device 101 of FIG. 1) and external electronic devices (for example, the second electronic devices 102 and the server 103 of FIG. 1). The information exchange application may include, for example, a notification relay application for transmitting specific information to the external electronic device, or a device management application for managing the external electronic device.

For example, the notification relay application may include a function of transferring, to the external electronic device, notification information generated from the other applications of the electronic device (for example, the SMS/MMS application, the e-mail application, the health management application, and the environmental information application). Further, the notification relay application may receive notification information from, for example, the external electronic device and provide the received notification information to the user. For example, the device management application may manage (for example, install, delete, or update) at least one function of the external electronic device (for example, the electronic device) that is communicating with the electronic device (for example, turning on/off the external electronic device itself (or some components) or adjusting luminance (or a resolution) of the display), applications operating in the external electronic device, or services provided by the external electronic device (for example, a call service and a message service).

According to an embodiment, the applications 2770 may include an application (for example, health management application) designated according to attributes of the external electronic device (for example, attributes of the electronic device such as the type of electronic device which corresponds to a mobile medical device). According to an embodiment, the applications 2770 may include an application received from the external electronic device. According to an embodiment, the applications 2770 may include a preloaded application or a third party application that can be downloaded from a server. The names of the components of the program module 2710 according to the illustrated embodiment illustrated may vary according to the type of OS.

At least a part of the programming module 2710 may be implemented in software, firmware, hardware, or a combination of two or more thereof. At least one of the programming module 2710 may be implemented (for example, executed) by, for example, the processor (for example, the AP 2710). At least a part of the programming module 2710 may, for example, include a module, a program, a routine, sets of instructions, or a process for performing at least one function.

The term "module" or "functional unit" used herein may, for example, mean a unit including one of hardware, software, and firmware or a combination of two or more of them. The "module" may be interchangeably used with, for example, the term "unit", "logic", "logical block", "component", or "circuit". The "module" or "function unit" may be a minimum unit of an integrated component element or a part thereof. The "module" may be a minimum unit for performing one or more functions or a part thereof. The "module" or "function unit" may be mechanically or electronically implemented. For example, the "module" or "function unit" according to the present disclosure may include at least one of an application-specific integrated circuit (ASIC) chip, a field-programmable gate arrays (FPGA), and a programmable-logic device for performing operations which has been known or are to be developed hereinafter.

At least one of the devices (for example, modules or functions thereof) or the method (for example, operations) according to the present disclosure may be implemented by a command stored in a computer-readable storage medium in a programming module form. When the command is executed by processors, the one or more processors may perform a function corresponding to the command. The computer-readable storage medium may be, for example, the storage unit 240 in FIG. 2.

The computer readable recoding medium may include a hard disk, a floppy disk, magnetic media (e.g., a magnetic tape), optical media (e.g., a compact disc read only memory (CD-ROM) and a digital versatile disc (DVD)), magneto-optical media (e.g., a floptical disk), a hardware device (e.g., a ROM, a RAM, a flash memory), and the like. In addition, the program instructions may include high class language codes, which can be executed in a computer by using an interpreter, as well as machine codes made by a compiler. Any of the hardware devices as described above may be configured to work as one or more software modules in order to perform the operations according to various embodiments of the present disclosure, and vice versa.

Any of the modules or programming modules according to various embodiments of the present disclosure may include at least one of the above described elements, exclude elements, or include other additional elements. The operations performed by the modules, programming module, or other elements according to various embodiments of the present disclosure may be executed in a sequential, parallel, repetitive, or heuristic manner. Further, some operations may be executed according to another order or may be omitted, or other operations may be added.

According to various embodiments of the present disclosure, a computer-readable recording medium having a program recorded therein to be executed in a computer is provided. The process may include identifying information related to a first communication performed between a first electronic device and a second electronic device, encrypting at least a part of information related to a second communication based on the identified information related to the first communication, and transmitting the information related to the second communication to the second electronic device.

According to various embodiments of the present disclosure, a computer-readable recording medium having a program recorded therein to be executed in a computer is provided. The process may include identifying information related to a first communication performed between a first electronic device and a second electronic device, receiving at least partially encrypted information related to the second communication from the first electronic device, and decrypting the received information related to the second communication based on the identified information related to the first communication.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A first electronic device comprising:
a transceiver;
a display unit;
an input unit; and
a processor configured to:
control the display unit to display an execution screen of an application for transmitting first information to a second electronic device, wherein a button to encrypt the first information to be transmitted to the second electronic device is displayed on the execution screen,
determine second information related to a communication performed between the first electronic device and the second electronic device, wherein the second information related to the communication includes at least one of a transmitted or received message log, a social network service log, a call log, an e-mail log, or an initial or last call time,
in response to the determining that the button is selected, encrypt data inputted through the input unit after the button is selected, by using an encryption key which is generated based on the second information related to the communication, and
control the transceiver to transmit the encrypted data to the second electronic device.

2. The first electronic device of claim 1, further comprising a display configured to display the second information related to the communication.

3. The first electronic device of claim 1, wherein the second information related to the communication is at least one of text information, an image, a dynamic image, sound source information, location information, or address book information.

4. The first electronic device of claim 1, wherein the processor is further configured to: control the transceiver to transmit a first hash value generated by hashing the second information related to the communication to the second electronic device, control the transceiver to receive a second hash value from the second electronic device, and when the received second hash value is equal to the first hash value, generate an encryption key for encrypting the second information related to the communication by using a part of the second information related to the communication.

5. The first electronic device of claim 1, wherein the processor is further configured to encrypt a part of the data input before the button is re-selected from among the data.

6. The first electronic device of claim 1, wherein, when the second information related to the communication is text information, the processor is further configured to encrypt at least one sentence including a set word in the text information by an encryption key generated based on the text information.

7. The first electronic device of claim 1, wherein, when the second information related to the communication is an image, the processor is further configured to encrypt an area selected in the image by an encryption key generated based on third information related to the image.

8. The first electronic device of claim 1, wherein, when the second information related to the communication is a dynamic image, the processor is further configured to encrypt a reproduction section selected in the dynamic image by an encryption key generated based on fourth information related to the dynamic image.

9. The first electronic device of claim 1, wherein the processor is further configured to: receive fifth information having an encrypted part from the second electronic device, and decrypt the fifth information having the encrypted part based on the second information related to the communication.

10. The first electronic device of claim 2, wherein the display is further configured to display a first input window for selecting a recipient, a second input window for inputting text information, and a first button on an execution screen, wherein the first button is a button for attaching an image, a picture, or a file.

11. A second electronic device comprising:
a transceiver; and
a processor configured to:
control the transceiver to identify information related to a communication performed between a first electronic device and the second electronic device,
control the transceiver to receive encrypted data from the first electronic device, wherein the encrypted data is encrypted by an encryption key which is generated based on the information related to the communication after a button displayed in the first electronic device is selected, and
decrypt the encrypted data based on the information related to the communication, wherein the information related to the communication includes at least one of a transmitted or received message log, a social network service log, a call log, an e-mail log, or an initial or last call time.

12. The second electronic device of claim 11, further comprising a display configured to: display the received information related to the communication such that the encrypted data cannot be identified, and when the encrypted data is decrypted, display the information related to the communication such that the encrypted data can be identified.

13. The second electronic device of claim 11, wherein the processor is further configured to: control the transceiver to receive a first hash value generated by hashing the information related to the communication from the first electronic device, extract the information related to the communication corresponding to the received first hash value, transmit a second hash value generated by hashing the information related to the communication corresponding to the received first hash value, to the first electronic device, and when the first hash value and the second has value are equal to each other, generate a decryption key for decrypting the information related to the communication by using a part of the information related to the communication corresponding to the first hash value.

14. A method of transmitting first information by a first electronic device, the method comprising:
displaying an execution screen of an application for transmitting first information to a second electronic device, wherein a button to encrypt the first information to be transmitted to the second electronic device is displayed on the execution screen;
identifying second information related to a communication performed between the first electronic device and a second electronic device, wherein the second information related to the communication includes at least one of a transmitted or received message log, a social network service log, a call log, an e-mail log, or an initial or last call time;
in response to the determining that the button is selected, encrypting data inputted through an input unit after the button is selected, by using an encryption key which is generated based on the identified second information related to the communication; and
transmitting the encrypted data to the communication to the second electronic device.

15. The method of claim 14, wherein the second information related to the communication is at least one of text information, an image, a dynamic image, sound source information, location information, or address book information.

16. The method of claim 14, wherein the identifying of the second information related to the communication performed between the first electronic device and the second electronic device comprises: extracting the second information related to the communication based on information on the second electronic device; transmitting a first hash value to the second electronic device that is generated by hashing the extracted second information related to the communication; receiving a second hash value from the second electronic device; and generating an encryption key for encrypting the second information related to the communication based on a part of the second information related to the communication when the received second hash value is equal to the first hash value.

17. The method of claim 14, further comprising encrypting a part of the data input before the button is re-selected from among the data.

18. The method of claim 14, further comprising: when the second information related to the communication is text information, identifying at least one sentence including a set word in the received or stored text information; and encrypting the at least one identified sentence by an encryption key generated based on the text information.

19. The method of claim 14, further comprising: when the second information related to the communication is an image, receiving a selection of a part of areas of the image; and encrypting the selected area by an encryption key generated based on third information related to the image.

20. The method of claim 14, further comprising:
when the second information related to the communication is a dynamic image, receiving a selection of a part of reproduction sections in the dynamic image; and
encrypting the selected reproduction section by an encryption key generated based on fourth information related to the dynamic image.

21. The method of claim 14, further comprising: receiving fifth information having an encrypted part from the second electronic device; and decrypting the fifth information having the encrypted part based on the second information related to the communication.

22. A method of receiving information by a second electronic device, the method comprising:
identifying information related to a communication performed between a first electronic device and the second electronic device;
receiving encrypted data from the first electronic device, wherein the encrypted data is encrypted by an encryption key which is generated based on the information related to the communication after a button displayed in the first electronic device is selected; and
decrypting the encrypted data based on the identified information related to the communication, wherein the information related to the communication includes at least one of a transmitted or received message log, a social network service log, a call log, an e-mail log, or an initial or last call time.

23. The method of claim 22, further comprising: displaying the received the information related to the communication such that the encrypted data cannot be identified; and when the encrypted part is decrypted, displaying the information related to the communication such that the encrypted part can be identified.

24. The method of claim 22, wherein the identifying of the information related to the communication performed between the first electronic device and the second electronic device comprises: receiving a first hash value generated by hashing the information related to the communication from the first electronic device; extracting the information related to the communication corresponding to the received first hash value; transmitting a second hash value generated by hashing the extracted information related to the communication corresponding to the received first hash value, to the first electronic device; and when the first hash value and the second has value are equal to each other, generating a decryption key for decrypting the encrypted information related to the communication by using a part of the information related to the communication corresponding to the first hash value.

25. A non-transitory computer-readable recording medium having a program recorded therein to be executed in a computer, the program comprising executable commands for performing a process to be performed by a processor, the process comprising:
displaying an execution screen of an application for transmitting first information to a second electronic device, wherein a button to encrypt the first information to be transmitted to the second electronic device is displayed on the execution screen;
identifying second information related to a communication performed between a first electronic device and a second electronic device, wherein the second information related to the communication includes at least one of a transmitted or received message log, a social network service log, a call log, an e-mail log, or an initial or last call time;

in response to the determining that the button is selected, encrypting data inputted through an input unit after the button is selected, by using an encryption key which is generated based on the identified second information related to the communication; and transmitting the encrypted data to the second electronic device.

26. A non-transitory computer-readable recording medium having a program recorded therein to be executed in a computer, the program comprising executable commands for performing a process to be performed by a processor, the process comprising:

identifying information related to a communication performed between a first electronic device and a second electronic device;

receiving encrypted data from the first electronic device, wherein the encrypted data is encrypted by an encryption key which is generated based on the information related to the communication after a button displayed in the first electronic device is selected; and decrypting the encrypted data based on the identified information related to the communication, wherein the information related to the communication includes at least one of a transmitted or received message log, a social network service log, a call log, an e-mail log, or an initial or last call time.

\* \* \* \* \*